(12) United States Patent
Tatsuno et al.

(10) Patent No.: US 12,284,451 B2
(45) Date of Patent: Apr. 22, 2025

(54) IMAGE CAPTURING DEVICE, DATA ACQUISITION UNIT, IMAGE CAPTURING SYSTEM, AND IMAGE CAPTURING METHOD

(71) Applicants: Hibiki Tatsuno, Kanagawa (JP); Kohei Ushio, Kanagawa (JP)

(72) Inventors: Hibiki Tatsuno, Kanagawa (JP); Kohei Ushio, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 50 days.

(21) Appl. No.: 18/185,645

(22) Filed: Mar. 17, 2023

(65) Prior Publication Data
US 2023/0308777 A1 Sep. 28, 2023

(30) Foreign Application Priority Data
Mar. 22, 2022 (JP) .................. 2022-044910

(51) Int. Cl.
*H04N 23/958* (2023.01)
*H04N 23/50* (2023.01)
*H04N 23/58* (2023.01)
*H04N 23/90* (2023.01)
*G01S 17/86* (2020.01)

(52) U.S. Cl.
CPC .......... *H04N 23/958* (2023.01); *H04N 23/50* (2023.01); *H04N 23/58* (2023.01); *H04N 23/90* (2023.01); *G01S 17/86* (2020.01)

(58) Field of Classification Search
CPC ...... H04N 23/958; H04N 23/50; H04N 23/58; H04N 23/90; H04N 23/00; H04N 23/55; G01S 17/86; G01S 7/4816; G01S 17/88; G01S 17/894; G03B 15/00; G03B 30/00; G03B 37/00
See application file for complete search history.

(56) References Cited

U.S. PATENT DOCUMENTS

| | | | | |
|---|---|---|---|---|
| 5,102,226 A | * | 4/1992 | Yoshimura | G01B 11/24 250/227.28 |
| 5,293,226 A | * | 3/1994 | Yamamoto | H04N 9/31 348/780 |
| 6,689,998 B1 | * | 2/2004 | Bremer | G02B 7/28 235/462.23 |
| 2003/0019930 A1 | * | 1/2003 | Hecht | G06K 7/10801 235/435 |
| 2005/0185249 A1 | * | 8/2005 | Uchiyama | G02B 13/0095 359/291 |

(Continued)

FOREIGN PATENT DOCUMENTS

| | | |
|---|---|---|
| JP | 2008-066325 | 3/2008 |
| JP | 2016-183934 | 10/2016 |

(Continued)

*Primary Examiner* — Hung H Lam
(74) *Attorney, Agent, or Firm* — IPUSA, PLLC

(57) ABSTRACT

An image capturing device includes: an image capturing lens having a central axis; and an image sensor having a sensor surface and a perpendicular line perpendicular to the sensor surface, the image sensor to capture an image of an object surface of an object. A Scheimpflug angle between the central axis and the perpendicular line is set to an angle other than 0° based on an angle α obtained by subtracting an inclination angle of the object surface from 90°.

13 Claims, 25 Drawing Sheets

(56) References Cited

U.S. PATENT DOCUMENTS

| | | | |
|---|---|---|---|
| 2018/0003970 A1* | 1/2018 | Otani | G02B 27/0101 |
| 2019/0056496 A1 | 2/2019 | Sakai et al. | |
| 2022/0214162 A1* | 7/2022 | Martin | G01B 11/2518 |
| 2023/0204353 A1* | 6/2023 | Toom | G01C 9/06 |
| | | | 356/139.1 |

FOREIGN PATENT DOCUMENTS

| | | |
|---|---|---|
| JP | 2019-033478 | 2/2019 |
| JP | 2019-074375 | 5/2019 |
| JP | 2021-148606 | 9/2021 |
| JP | 2023-030711 | 3/2023 |

* cited by examiner

FIG. 7

| TYPE NO. | TYPE NAME | TRAINING IMAGE | REMARKS |
|---|---|---|---|
| 1 | RETAINING WALL |  | - |
| 2 | SLOPE RETAINING FRAME |  | THE PRESENCE OR ABSENCE OF ANCHORS IS NOT DISTINGUISHED |
| 3 | SPRAY MORTAR | 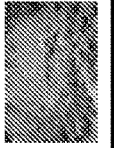 | - |
| 4 | WIRE MESH, FENCE (RETAINING WALL) | 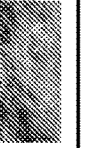 | ASSIGN TO STRUCTURE INCLUDING RETAINING WALL AND WIRE MESH OR FENCE |
| 5 | WIRE MESH, FENCE (SLOPE RETAINING FRAME) | - | ASSIGN TO STRUCTURE INCLUDING SLOPE RETAINING FRAME AND WIRE MESH OR FENCE |
| 6 | WIRE MESH, FENCE (SPRAY MORTAR) | - | ASSIGN TO STRUCTURE INCLUDING SPRAY MORTAR AND WIRE MESH OR FENCE |
| 7 | WIRE MESH, FENCE (OTHERS) | - | ASSIGN TO ONLY WIRE MESH OR FENCE OR OBJECT WHOSE STATE TYPE BEHIND WIRE MESH OR FENCE IS UNKNOWN |
| 8 | BLOCK, JOINT | 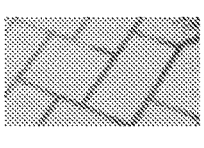 | - |

FIG. 8

| TYPE NO. | TYPE NAME | TRAINING IMAGE | REMARKS |
|---|---|---|---|
| 9 | DRAINAGE HOLE, PIPE |  | CLOGGING CAUSES INFLOW WATER |
| 10 | DRAINAGE CHANNEL OF SMALL STEP |  | CLOGGING CAUSES INFLOW WATER |
| 11 | INFLOW WATER |  | INDICATE POSSIBILITY THAT ACCUMULATED WATER ARE APPLYING PRESSURE FROM BACK SIDE OF SLOPE |
| 12 | MOSS, PLANTS |  | MAY BE CAUSED DUE TO INFLOW WATER |
| 13 | FALLING STONE |  | INDICATE POSSIBILITY THAT ABNORMALITY IS PRESENT ON BACK SIDE AND UPPER SIDE OF SLOPE |
| 14 | SOIL AND SAND |  | INDICATE POSSIBILITY THAT ABNORMALITY IS PRESENT ON BACK SIDE AND UPPER SIDE OF SLOPE |
| 15 | SUNSHINE |  | POSSIBILITY OF INFLOW WATER IS DETERMINED BASED ON SUNSHINE AND TYPE OF MOSS |
| ⋮ | | | ⋮ |
| 97 | POLE, UTILITY POLE |  | ASSIGN TO OBJECT TO WHICH NO SIGN OR SIGNBOARD IS ATTACHED ASSIGN THIS TAG, IF SIGN OR SIGNBOARD IS REGARDED AS A SUBSTANTIALLY STRAIGHT LINE WHEN HORIZONTALLY ORIENTED |
| 98 | SIGN, SIGNBOARD |  | ASSIGN TO OBJECT TO WHICH NO FRAME IS ASSIGNED INCLUDING SUPPORT OR FIXING JIG TO WHICH SIGN OR SIGNBOARD IS ATTACHED |

FIG. 9A

ACQUIRED DATA MANAGEMENT TABLE

FOLDER NAME: SY4950

| CAPTURED-IMAGE DATA | SENSOR DATA | ACQUISITION TIME |
|---|---|---|
| R0509tm | S9579kj | 2020/3/6  14:05:50.904863 |
| R0510tm | S9580kj | 2020/3/6  14:05:51.208568 |
| R0511tm | S9581kj | 2020/3/6  14:05:51.807980 |
| ... | ... | ... |

FIG. 9B

PROCESSED DATA MANAGEMENT TABLE

FOLDER NAME: TM0615

| EVALUATION TARGET DATA | EVALUATION DATA | POSITIONING DATA | COMMENT |
|---|---|---|---|
| C3467im | P1276th | NORTH LATITUDE XX, EAST LONGITUDE YY | ROUTE NAME: RIKOU LINE _ INBOUND _ ROUTE 1 |
| C3468im | P1277th | NORTH LATITUDE XZ, EAST LONGITUDE YZ | ... |
| C3469im | P1278th | NORTH LATITUDE XY, EAST LONGITUDE YX | ... |
| ... | ... | ... | ... |

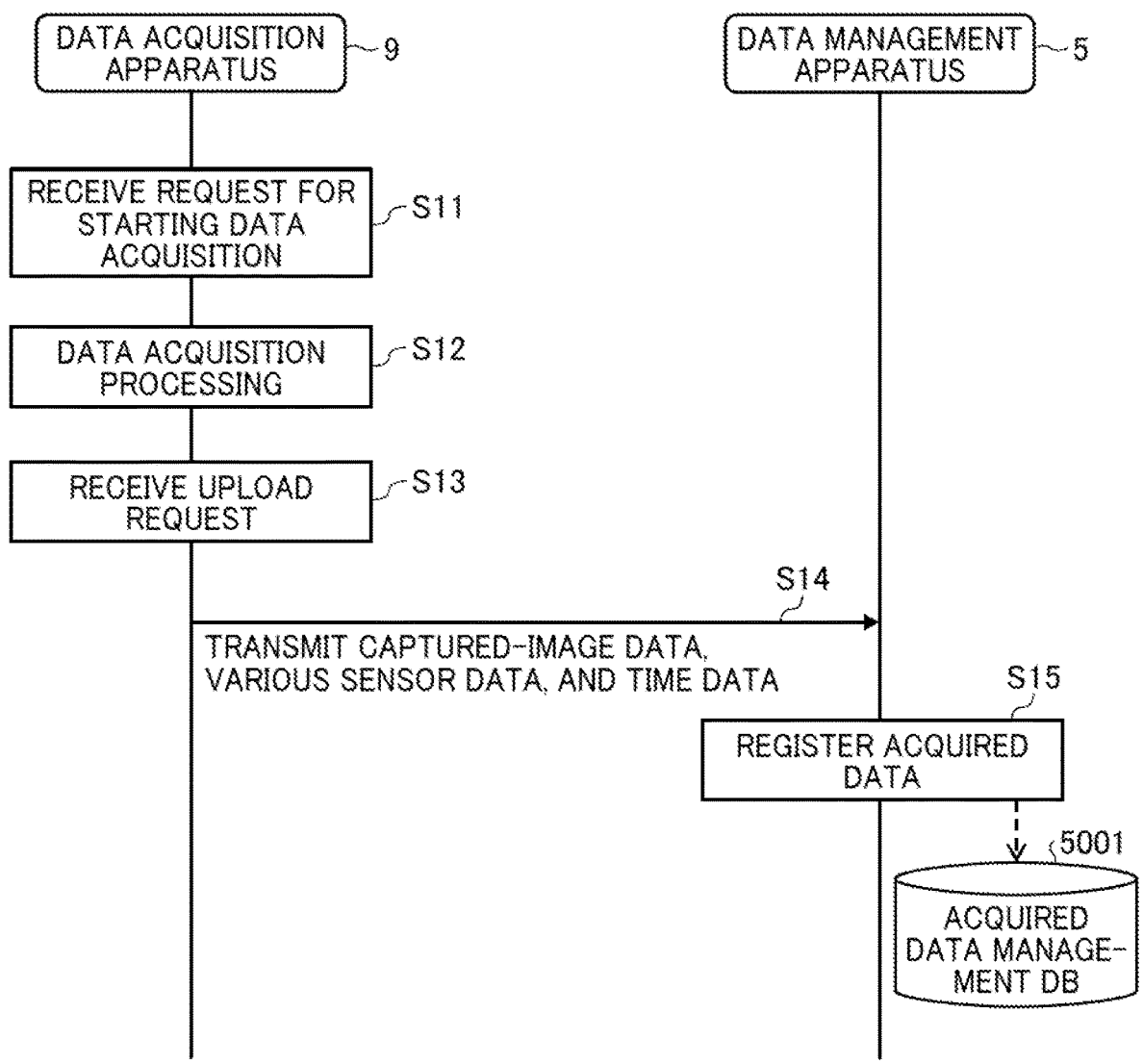

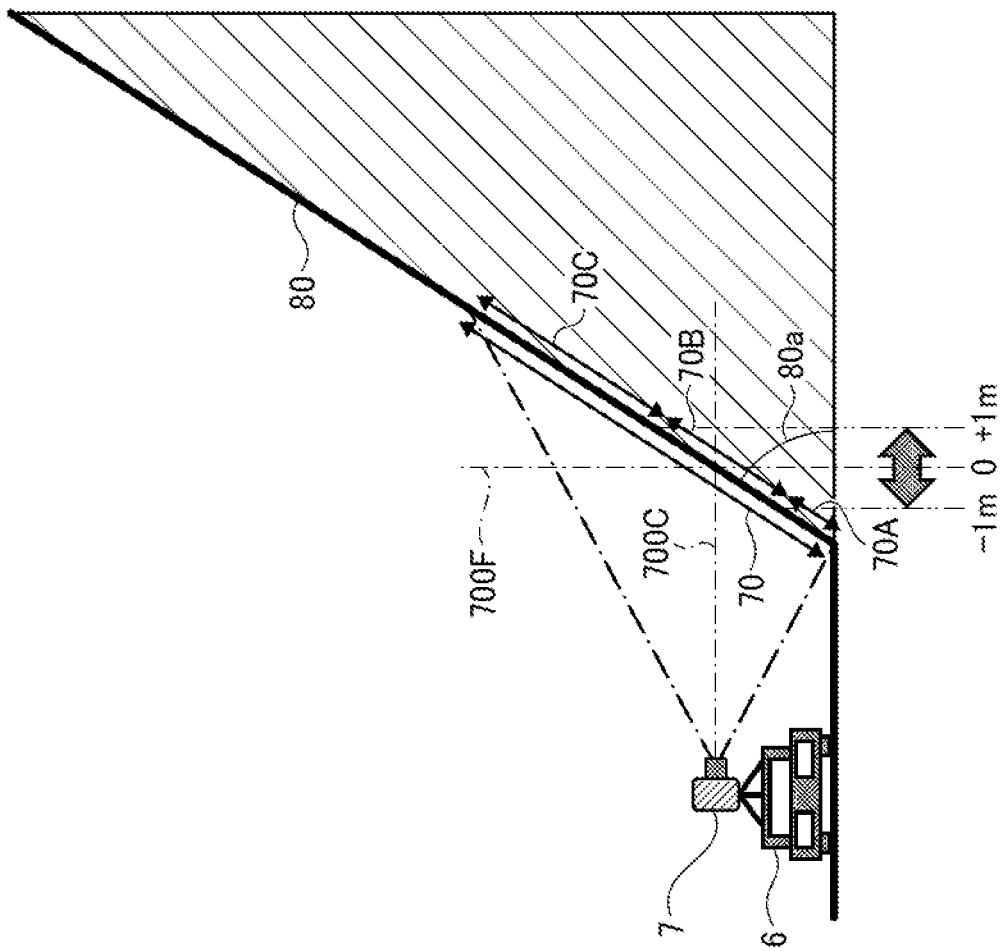
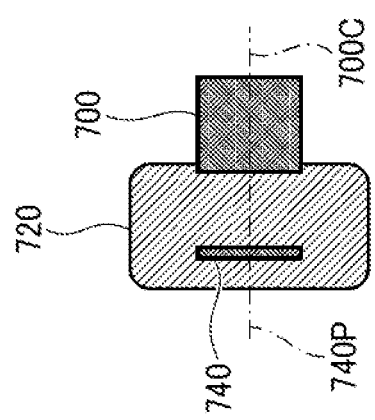

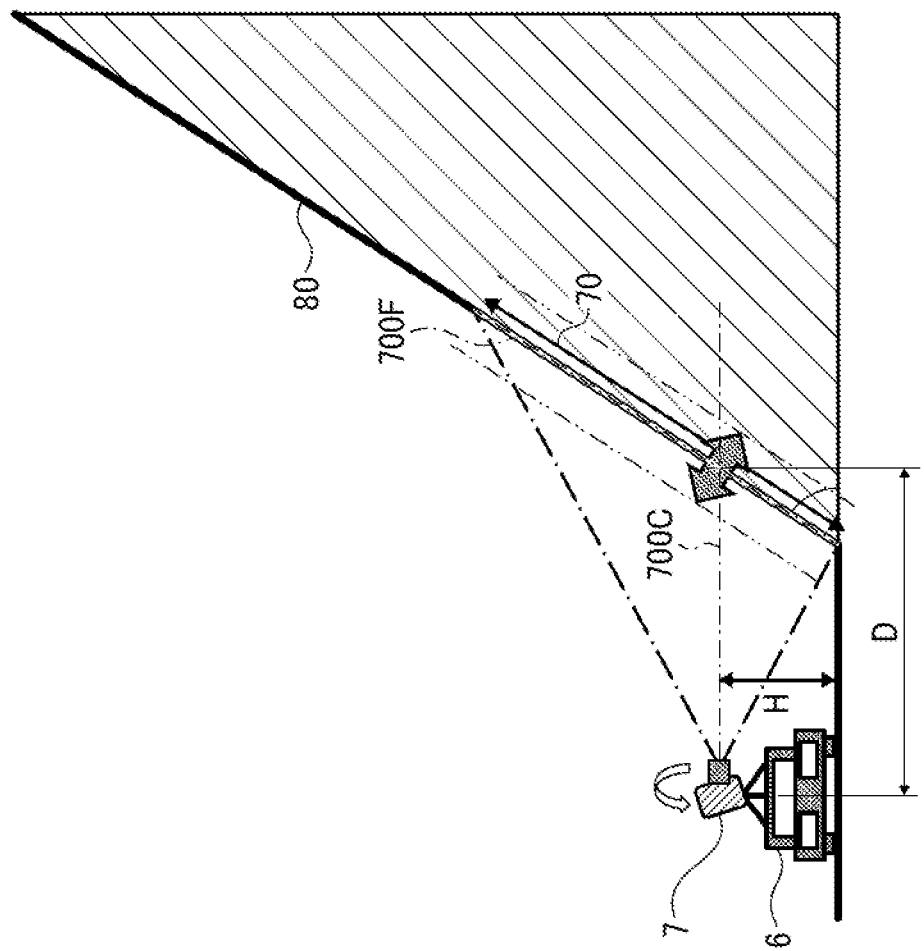
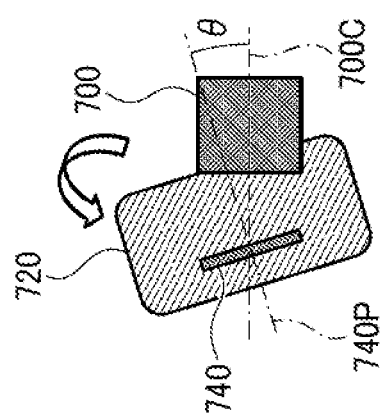

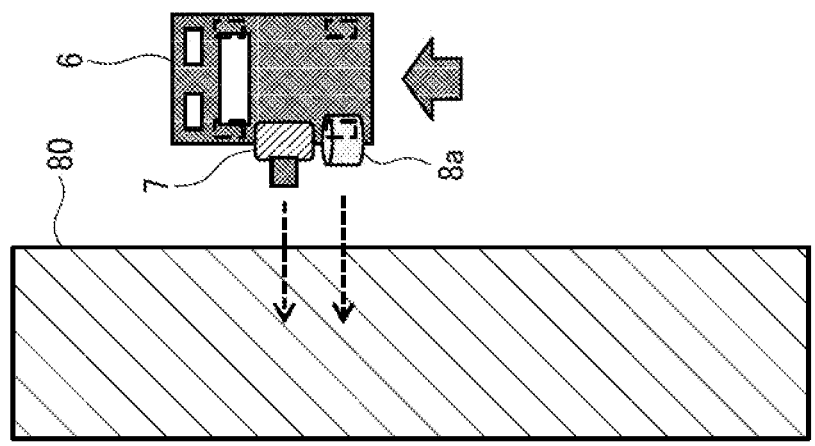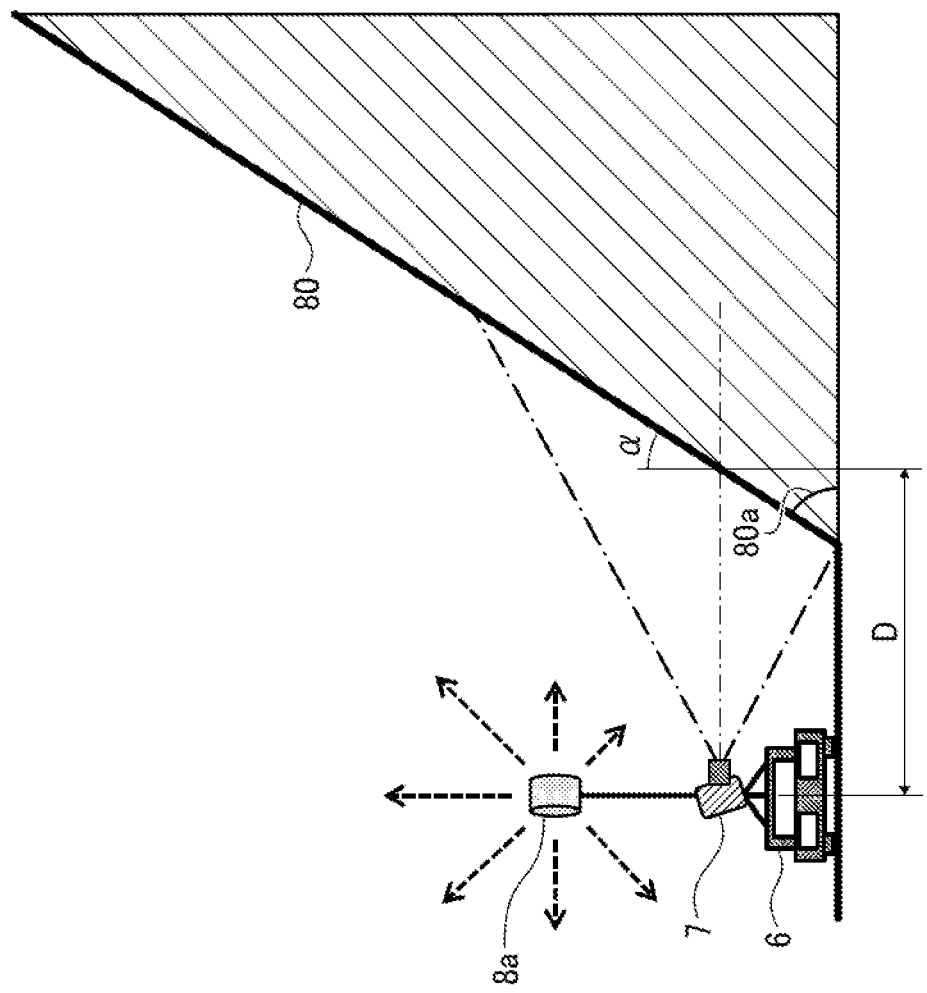

IMAGE CAPTURING DEVICE, DATA ACQUISITION UNIT, IMAGE CAPTURING SYSTEM, AND IMAGE CAPTURING METHOD

CROSS-REFERENCE TO RELATED APPLICATIONS

This patent application is based on and claims priority pursuant to 35 U.S.C. § 119(a) to Japanese Patent Application No. 2022-044910, filed on Mar. 22, 2022, in the Japan Patent Office, the entire disclosure of which is incorporated by reference herein.

BACKGROUND

Technical Field

The present disclosure relates to an image capturing device, a data acquisition unit, an image capturing system, and an image capturing method.

Related Art

Images of a slope is sequentially captured by using multiple cameras, in which each focal length of the multiple cameras is different, mounted on an automobile traveling on a flat surface beside or above the slope. Each of multiple cameras captures a different image of a corresponding region of the slope in height direction. A position measurement system mounted on the automobile records the position in which the images are captured and observes the appearance and the state of the slope using the result of photogrammetry based the image and the position. When the change is recognized, the state and the position are specified.

SUMMARY

An image capturing device includes: an image capturing lens having a central axis; and an image sensor having a sensor surface and a perpendicular line perpendicular to the sensor surface, the image sensor to capture an image of an object surface of an object. A Scheimpflug angle between the central axis and the perpendicular line is set to an angle other than 0° based on an angle α obtained by subtracting an inclination angle of the object surface from 90°.

Further, an embodiment of the present disclosure provides a data acquisition unit includes: the image capturing device; and a distance sensor to measure a distance between the image capturing device and the object surface. The circuitry changes the Scheimpflug angle based on the distance measured by the distance sensor.

Further, an embodiment of the present disclosure provides an image capturing system includes: a vehicle; and an image capturing device on the vehicle, the image capturing device comprising: an image capturing lens having a central axis; and an image sensor having a sensor surface and a perpendicular line perpendicular to the sensor surface, the image sensor to capture an image of an object surface of an object. A Scheimpflug angle between the central axis and the perpendicular line is set to an angle other than 0° based on an angle α obtained by subtracting an inclination angle of the object surface from 90°.

Further, an embodiment of the present disclosure provides an image capturing method includes: installing an image capturing device on the vehicle, the image capturing device including an image capturing lens having a central axis and an image sensor having a sensor surface; setting a Scheimpflug angle between the central axis and a perpendicular line perpendicular to the sensor surface to an angle other than 0° based on an angle α obtained by subtracting an inclination angle of the object surface from 90°; and capturing an image of an object surface of an object with the image capturing device while moving the vehicle.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is an illustration of an example of a state type management table according to an embodiment of the present disclosure;

FIG. 8 is an illustration of an example of a state type management table according to an embodiment of the present disclosure;

FIG. 9A is a conceptual diagram of an example of an acquired data management table;

FIG. 9B is a conceptual diagram of another example of an processed data management table;

FIG. 12 is a sequence diagram illustrating an example of an operation of acquiring data using the mobile apparatus system according to an embodiment of the present disclosure;

FIG. 16A is a diagram of a configuration of a typical image capturing device according to an embodiment of the present disclosure;

FIG. 16B is a diagram of a configuration of an image capturing system including the image capturing device in FIG. 16A, according to an embodiment of the present disclosure;

FIG. 17A is a diagram of a configuration of an image capturing device according to an embodiment of the present disclosure;

FIG. 17B is a diagram of a configuration of an image capturing system according to an embodiment of the present disclosure;

FIG. 18A is a diagram of a configuration of an image capturing device and system according to an embodiment of the present disclosure;

FIG. 18B is a top view of the configuration of the image capturing device and system in FIG. 18A;

Figure 1:
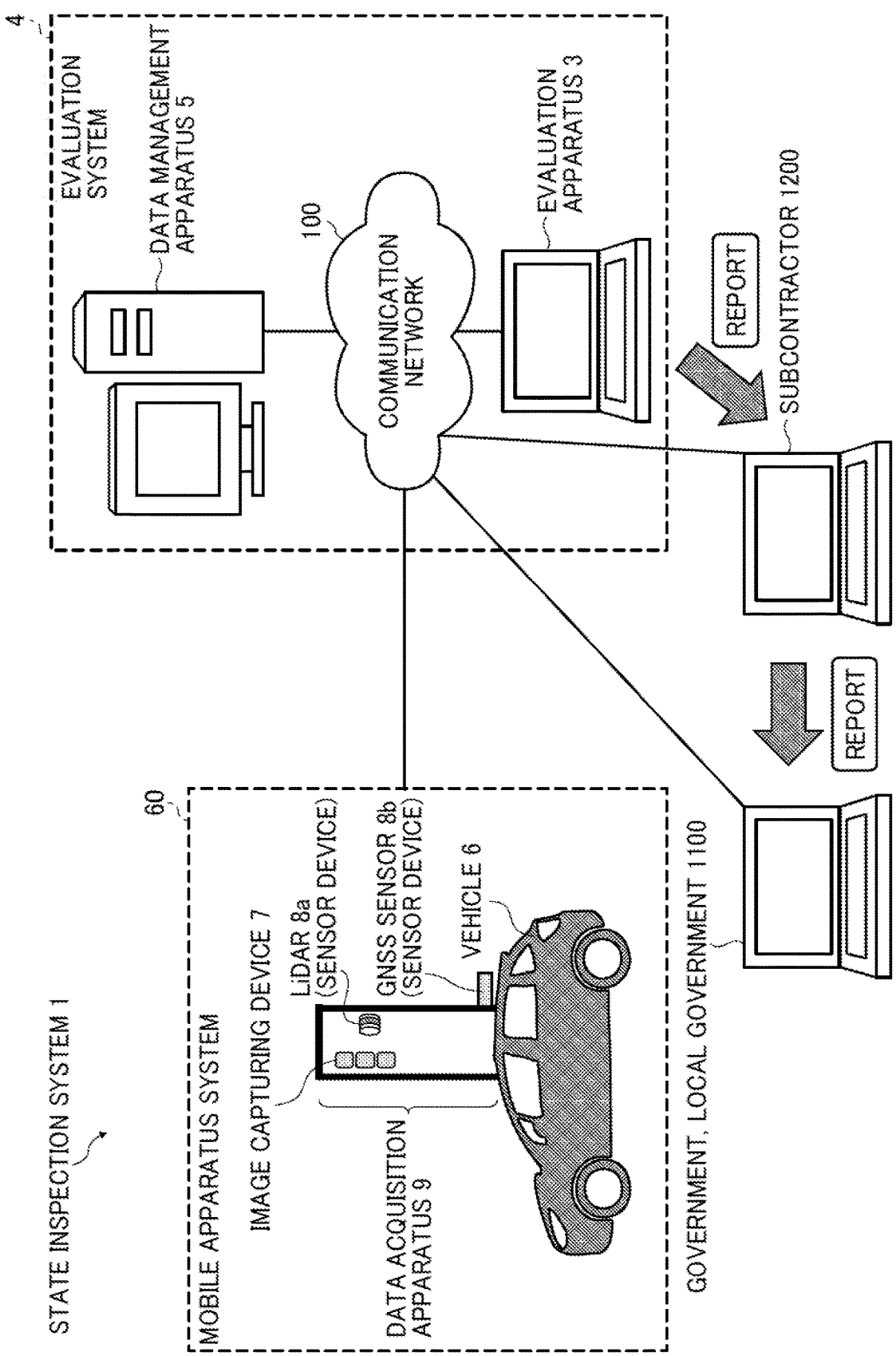
FIG. 1 is a schematic view of an overall configuration of a state inspection system according to according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

According to the embodiments of the present invention, an in-focus image for a wide region of a slope can be acquired.

Hereinafter, embodiments of the present invention will be described with reference to the drawings. In the description of the drawings, the same components are denoted by the same reference numerals, and overlapping description will be omitted. First Embodiment. First, the outline of the state inspection system will be described with reference to FIGS. 1 and 2. FIG. 1 is a schematic view illustrating an overall configuration of the state inspection system 1 according to one of the embodiments. The state inspection system 1 illustrated in FIG. 1 is an example of an information processing system. The state inspection system 1 inspects a state of a road earthwork structure using various data acquired by a mobile apparatus system 60. The road earthwork structure is a term that collectively refers to structures made of ground materials as a main material such as earth and sand or rocks for constructing road, and structures associated with such the structures made of ground materials as a main material. For example, the road earthwork structure refers to facilities for stabilizing cut slopes and slopes, embarkments, culverts, and other similar items. In the following description, the road earthwork structure is referred to as a "slope" or an object surface.

The state inspection system 1 includes the mobile apparatus system 60, an evaluation system 4, a terminal apparatus 1100 of a national government or a local government, and a terminal apparatus 1200 of a subcontractor. The mobile apparatus system 60 includes a data acquisition apparatus 9 and a mobile apparatus 6 (e.g., vehicle). The data acquisition apparatus 9 is mounted on the mobile apparatus 6 (e.g., vehicle). The data acquisition apparatus 9 includes an image capturing device 7, a distance sensor 8a, and a global navigation satellite system (GNSS) sensor 8b. The image capturing device 7 is an example of a measuring device that measures a structure. GNSS is a term that collectively refers to satellite positioning systems such as a global positioning system (GPS) or quasi-zenith satellite (QZSS).

The image capturing device 7 is a line camera including a line sensor in which photoelectric conversion elements are arranged in one or more rows. The image capturing device 7 photographs a position along a predetermined photographing range on a photographing surface along a direction of travel of the mobile apparatus 6 (e.g., vehicle). The line camera is merely one example of the image capturing device. In another example, a camera including an area sensor in which photoelectric conversion elements are arranged in a plane may be used as the image capturing device 7. In another example, the image capturing device 7 may be implemented by multiple cameras.

The distance sensor 8a is a time-of-flight (ToF) sensor. The distance sensor 8a measures a distance from a subject photographed by the image capturing device 7. The GNSS sensor 8b is a position measuring device that measures a position on the earth by receiving signals transmitted from multiple GNSS satellites at multiple times and calculating distances to the satellites based on differences from the times at which the signals are received. The position measuring device may be a device dedicated to position measuring or an application dedicated to position measuring installed in, for example, a personal computer (PC) or a smartphone. The distance sensor 8a and the GNSS sensor 8b are examples of a sensor device. The distance sensor 8a is an example of a three-dimensional sensor.

The ToF sensor used as the distance sensor 8a emits laser light to an object from a light source and measures light scattered or reflected on the object, to measure a distance from the light source to the object.

In the present embodiment, the distance sensor 8a is a light detection and ranging (LiDAR) sensor. The LiDAR is a technology that measures a light flight time using pulses. Alternatively, as another method of the ToF sensor, the distance may be measured using a phase difference detection method. In the phase difference detection method, laser light on which amplitude-modulation at a fundamental frequency has been performed is emitted to an area to be measured and light reflected on the area to be measured is received. A phase difference between the emitted light and the reflected light is measured to obtain time. The time is multiplied by the speed of light, thereby a distance is obtained. Alternatively, the distance sensor 8a may be implemented by, for example, a stereo camera.

By using the three-dimensional sensor, the mobile apparatus system 60 can obtain three-dimensional information that is difficult to obtain from a two-dimensional image, such as a height of a slope, an inclination angle, or swelling.

An angle sensor 8c may be further mounted on the mobile apparatus system 60. The angle sensor 8c is, for example, a gyroscopic sensor for detecting an angle (posture) or angular velocity (or each acceleration) of the photographing direction of the image capturing device 7.

The evaluation system 4 includes an evaluation apparatus 3 and a data management apparatus 5. The evaluation apparatus 3 and the data management apparatus 5 of the evaluation system 4 are communicably connected to the mobile apparatus system 60, the terminal apparatus 1100, and the terminal apparatus 1200 through a communication network 100. The communication network 100 includes the Internet, a mobile communication network, and a local area network (LAN), for example. The communication network 100 includes a network by not only wired communications but also a network by wireless communications such as 3rd generation (3G), 4th generation (4G), 5th generation (5G), Wireless Fidelity (Wi-Fi®), Worldwide Interoperability for Microwave Access (WiMAX), or Long Term Evolution (LTE). Further, the evaluation apparatus 3 and the data management apparatus 5 may have a communication function using a short-range communication technology such as near field communication (NFC®).

The data management apparatus 5 is an example of an information processing apparatus. The data management apparatus 5 is a computer such as a PC that manages various data acquired by the data acquisition apparatus 9. The data management apparatus 5 receives various acquired data from the data acquisition apparatus 9 and transfers the received various acquired data to the evaluation apparatus 3 that performs data analysis. The transfer of the various acquired data from the data management apparatus 5 to the evaluation apparatus 3 may performed manually, for example, using a universal serial bus (USB) memory.

The evaluation apparatus 3 is a computer such as a PC that evaluates a state of a slope based on the various acquired data transferred from the data management apparatus 5. The evaluation apparatus is installed with a dedicated application program for evaluating a state of a slope is installed in the evaluation apparatus 3. The evaluation apparatus 3 detects a type or structure of the slope according to captured image data and sensor data to extract shape data, and performs detailed analysis such as detecting the presence or absence of a deformation and the degree of the deformation. Further, the evaluation apparatus 3 generates a report using the captured image data, the sensor data, evaluation target data, and the detailed analysis result. The report is to be submitted to an entity that manages roads such as a national government, a local government, or a subcontractor. Data of the report generated by the evaluation apparatus 3 is submitted to the national government or the local governments via the subcontractor in the form of electronic data or printed documents. The report generated by the evaluation apparatus 3 is referred to as a "survey record sheet," a "check list," a "survey profile," or "records", for example. The PC is merely one example of the evaluation apparatus 3. Alternatively, a smartphone, a tablet terminal, or the like may be used for the evaluation apparatus 3. In another example, the evaluation apparatus 3 and the data management apparatus 5 of the evaluation system 4 are constructed as a single apparatus or terminal.

The terminal apparatus 1200 is provided in the subcontractor. The terminal apparatus 1100 is provided in the national government or the local government. The evaluation apparatus 3, the terminal apparatus 1100, and the terminal apparatus 1200 are examples of communication terminals communicably connected to the data management apparatus 5. Various data managed by the data management apparatus 5 can be viewed at the evaluation apparatus 3, the terminal apparatus 1100, and the terminal apparatus 1200.

Figure 2:
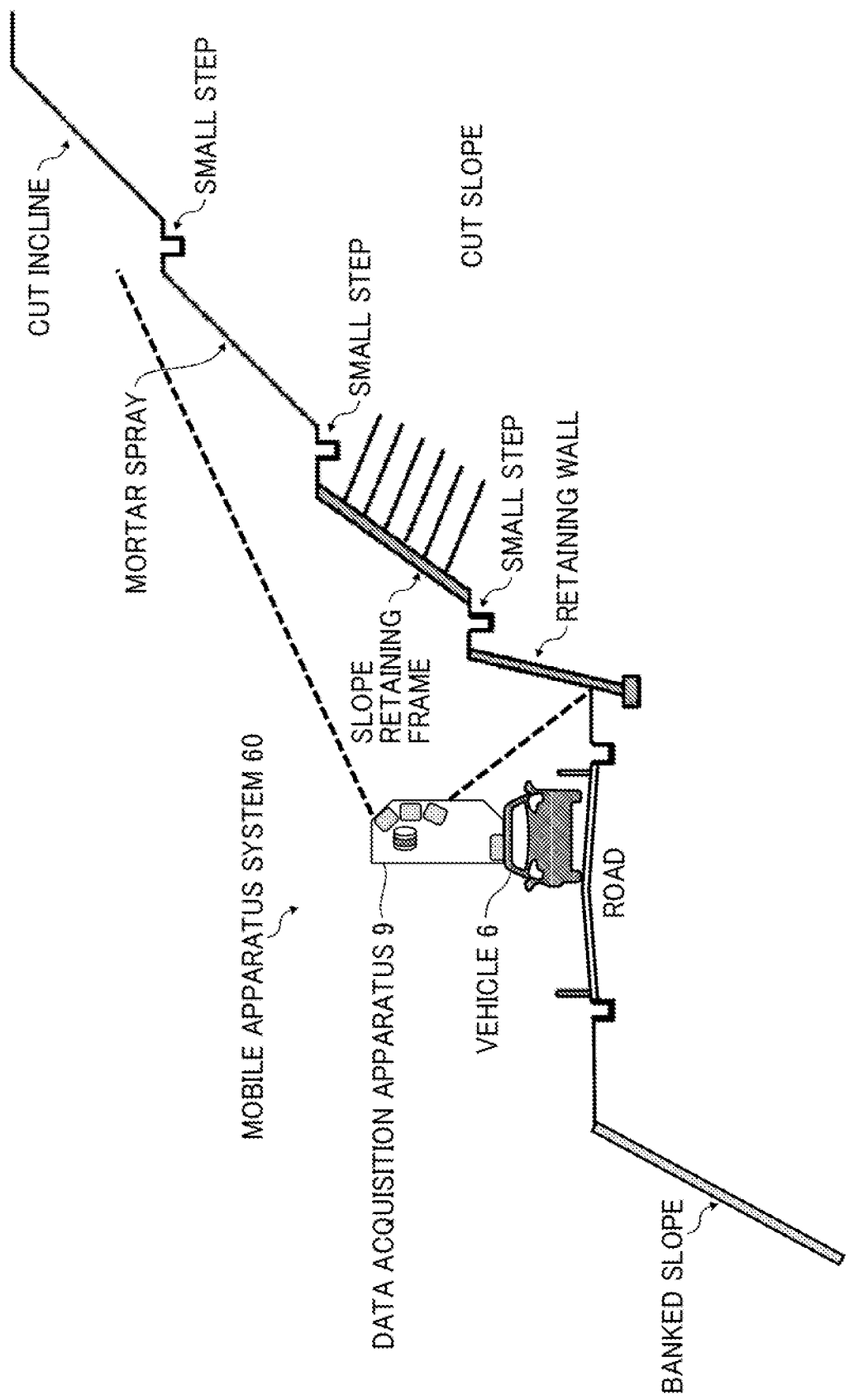
FIG. 2 is an illustration of an example of a situation in which a state of a slope is inspected using a mobile apparatus system, according to an embodiment of the present disclosure.

FIG. 2 is an illustration of an example of a situation in which a state of a slope is inspected using the mobile apparatus system 60, according to the embodiment. As illustrated in FIG. 2, the mobile apparatus system 60 photographs a predetermined area of the slope with the image capturing device 7 as causing the mobile apparatus 6 (e.g., vehicle) equipped with the data acquisition apparatus 9 to travel on a road.

As illustrated in FIG. 2, in the slope, a slope constructed by cutting a natural slope is referred to as a "cut slope," and a slope filled with soil is referred to as a "banked slope." A slope on the side of a road running along the side of a mountain is referred to as a "natural slope." Cut slopes and banked slopes can be made more durable by planting plants on the surface of the slopes, and can be left unchanged for several decades. However, in other cases, as deterioration of cut slopes, banked slopes, and natural slopes progresses due to wind and rain, a surface layer collapse occurs in which rocks and soil on the surface fall or a collapse occurs in which mountains collapse to cause road blockage. In order to avoid such a situation, a method is adopted in which mortar is sprayed on the surface of the slope (mortar spraying), or a concrete structure is installed and hardened to slow down the speed at which slopes deteriorates due to wind and rain. A structure constructed by the above method is called an earthwork structure. The earthwork structure includes, for example, a retaining wall installed between a natural slope and a road, a rockfall protection fence for preventing falling rocks from falling onto a road. Such earthwork structure is for preventing prevent road blockade or human damage caused by the outflow of earth and sand, or fallen rocks to a road.

In recent years, the deterioration of earthwork structures constructed several decades ago is remarkable, and the maintenance of social infrastructure is a major issue. For this reason, deterioration of earthwork structures has to be detected at an early stage, inspection and aging maintenance have to be performed to extend the life of earthwork structures. As known in the related art, an inspection of natural slopes and earthwork structures includes investigating fallen rocks, collapses, landslides or debris flow on slopes to prepare a repair plan. In the related art, the inspection is performed by visual inspections by experts.

However, visual inspections by experts have drawbacks in terms of efficiency, such as the inability to inspect many earthwork structures in the country in a certain period of time, and the impossibility of inspecting embankments at high places or along rivers. Further, by visual inspection, the degree of progress of deformation such as cracks or separations that occur on surface layers of earthwork structures cannot be quantitatively recognized.

To address an issue as described above, the state inspection system 1 according to an embodiment acquires captured image data of an earthwork structure slope using the image capturing device 7, and acquires sensor data including three-dimensional information by a three-dimensional sensor such as the distance sensor 8a. The evaluation system 4 evaluates the state of the slope by combining the acquired captured image data and sensor data, to detect shape data indicating a three-dimensional shape of the slope and detect deformations such as cracks or separations. With this configuration, the state inspection system 1 can efficiently perform an evaluation that is difficult by human visual inspection.

FIG. 3 is a diagram for describing a slope state. FIG. 3A is an image of a surface of a slope that is captured five years before the collapse of the slope. FIG. 3B is an explanatory view of the image of FIG. 3A. A state indicated by FIG. 3A and FIG. 3B is a stage in which cracks on the surface layer of the slope are conspicuous. For this state, image analysis indicated in, for example, a developed view is effective for detecting deformation or signs of deformation of the surface layer such as cracks, separations, or inflow water.

Figure 3B:
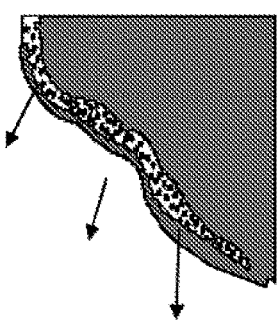
FIG. 3B is an explanatory view of the image of FIG. 3A.
Figure 3D:
FIG. 3D is an explanatory view of the image of FIG. 3C.
Figure 3F:
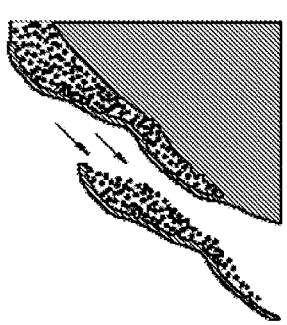
FIG. 3F is an explanatory view of the image of FIG. 3E.
Figure 3A:
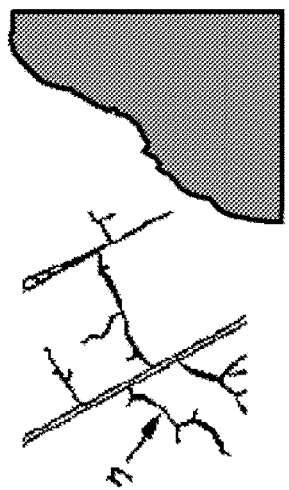
FIG. 3A is an image for describing a slope state according to an embodiment of the present invention.
Figure 3C:
FIG. 3C is an image for describing another slope state according to an embodiment of the present invention.
Figure 3E:
FIG. 3E is an image for describing still another slope state according to an embodiment of the present invention.

FIG. 3C is an image of a surface of the slope captured two years before the collapse thereof. FIG. 3D is an explanatory view of the image of FIG. 3C. A state indicated by FIG. 3C and FIG. 3D is a stage in which the inside of the slope changes to earth and sand, the earth and sand pushes the surface layer of the slope, and thereby the slope swells. For this state, a three-dimensional analysis using a combination of an image such as a development view and a cross-sectional view is effective for detecting three-dimensional deformation such as bumps with cracks and swellings.

Figure 4:
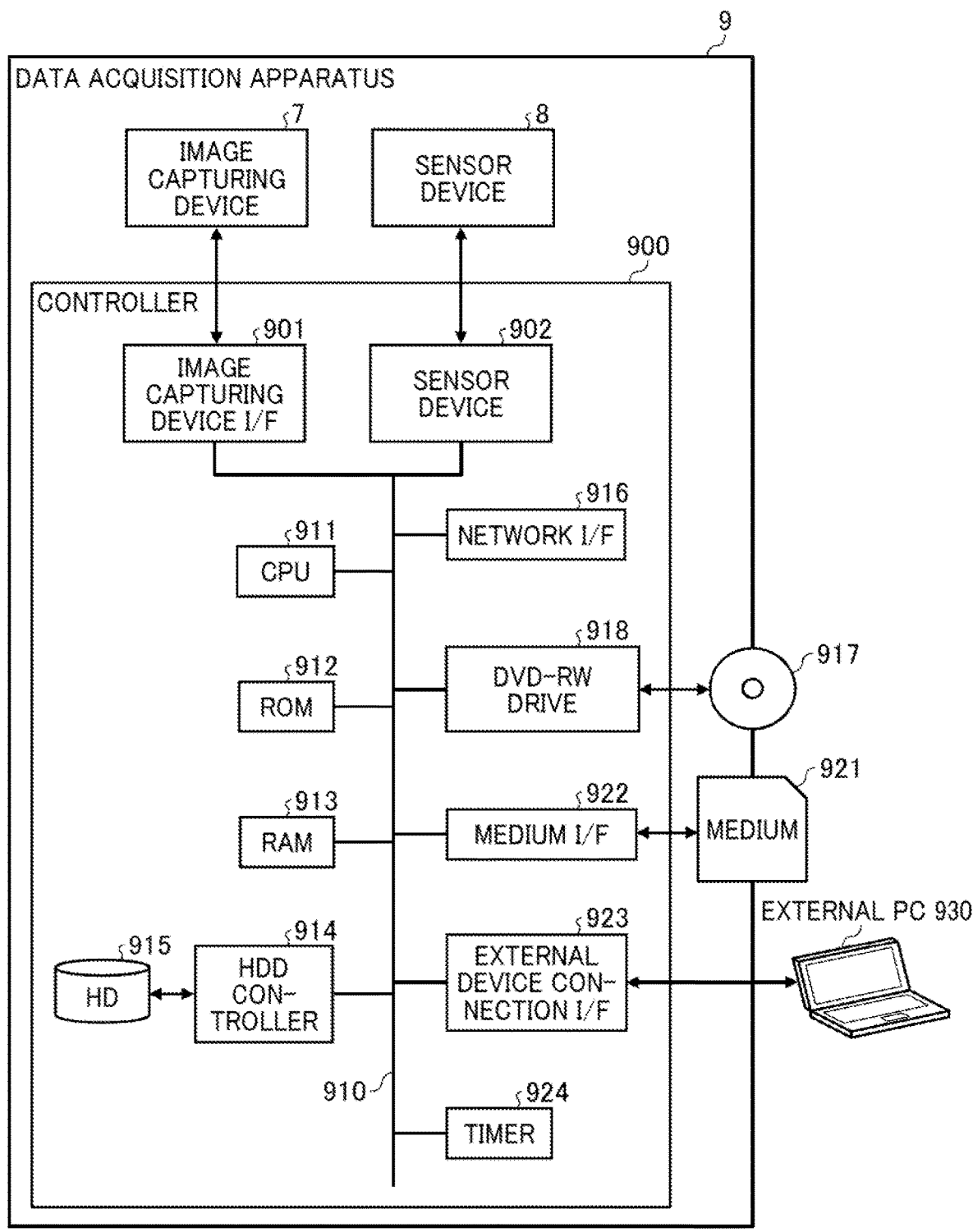
FIG. 4 is a block diagram illustrating an example of a hardware configuration of a data acquisition apparatus according to an embodiment of the present disclosure.
Figure 5:
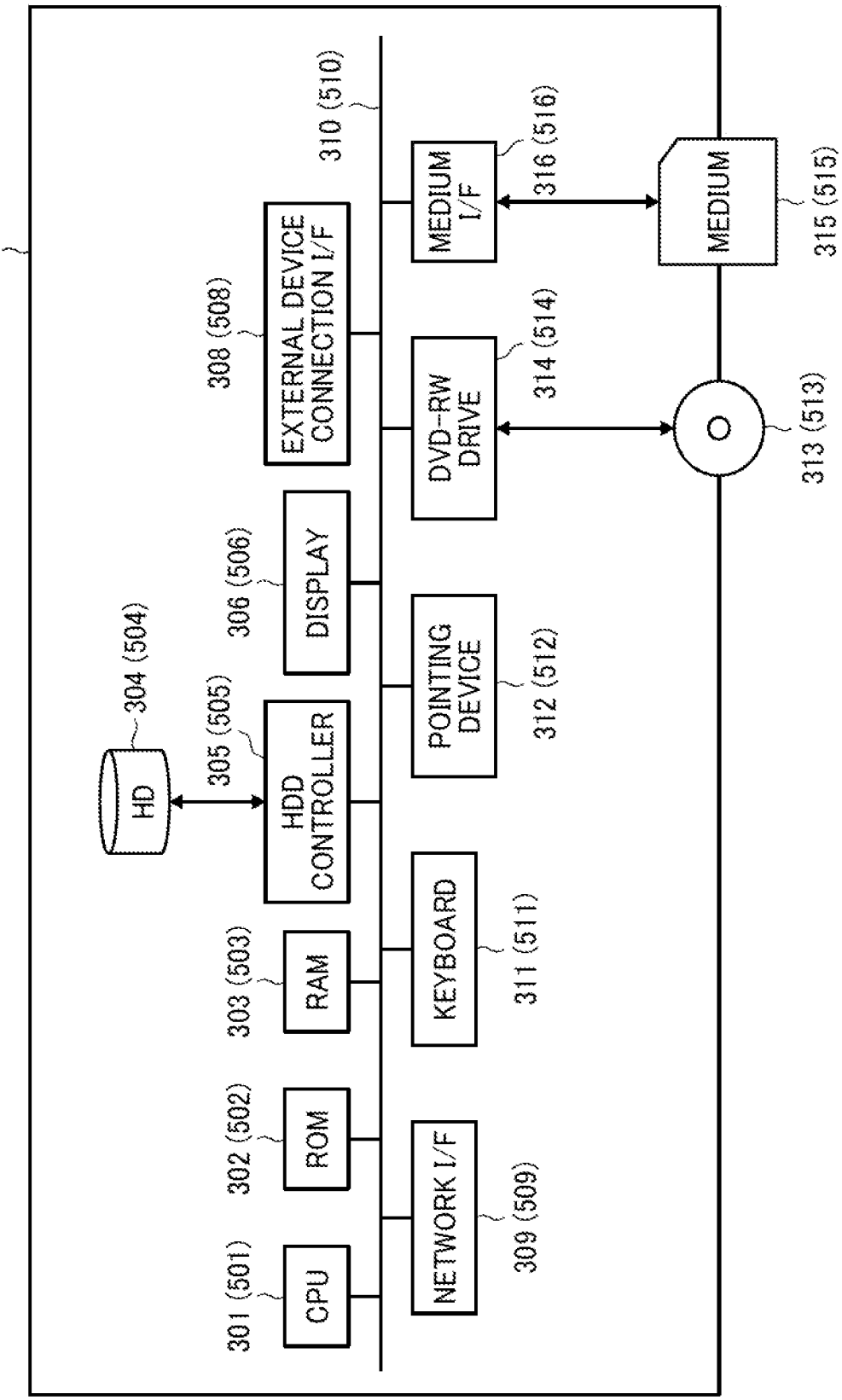
FIG. 5 is a block diagram illustrating an example of a hardware configuration of each of an evaluation apparatus and a data management apparatus according to an embodiment of the present disclosure.

FIG. 3D is an image of a surface of a slope that is captured five years before the collapse of the slope. FIG. 3B is an explanatory view of the image of FIG. 3A. As indicted by FIG. 3E and FIG. 3F, the surface layer of the slope collapses as the surface layer is too weakened to contain earth and sand. Hardware Configuration: Referring to FIG. 4 and FIG. 5, a hardware configuration of each of the apparatuses of the state inspection system 1 is described. In the hardware configurations illustrated in FIG. 4 and FIG. 5, components or elements may be added or deleted as needed. Hardware Configuration of Data Acquisition Apparatus FIG. 4 is a block diagram illustrating an example of a hardware configuration of the data acquisition apparatus 9. The data acquisition apparatus 9 includes the image capturing device 7 and the sensor device 8 as illustrated in FIG. 1, and a controller 900 that controls processing or operation of the data acquisition apparatus 9.

The controller 900 includes an image capturing device interface (I/F) 901, a sensor device I/F 902, a bus line 910, a central processing unit (CPU) 911, a read only memory (ROM) 912, a random access memory (RAM) 913, a hard disk (HD) 914, a hard disk drive (HDD) controller 915, a network I/F 916, a digital versatile disk rewritable (DVD-RW) drive 918, a medium I/F 922, an external device connection I/F 923, and a timer 924.

The image capturing device I/F 901 is an interface through which the controller 900 transmits and receives various data or information to and from the image capturing device 7. The sensor device I/F 902 is an interface through which the controller 900 transmits and receives various data or information to and from the sensor device 8. Examples of the bus line 910 include, but are not limited to, an address bus and a data bus that electrically connects the components illustrated in FIG. 4 such as the CPU 911.

The CPU 911 controls overall operation of the data acquisition apparatus 9. The ROM 912 stores a program such as an initial program loader (IPL) to boot the CPU 911. The RAM 913 is used as a work area for the CPU 911. The HD 914 stores various data such as programs. The HDD controller 915 controls reading or writing of various data to or from the HD 914 under control of the CPU 911. The network I/F 916 is an interface that controls communication of data with an external device through the communication network 100.

The DVD-RW drive 918 controls reading or writing of various data to or from a DVD-RW 917, which is an example of a removable storage medium. In another example, the removable storage medium includes at least one of digital versatile disk-recordable (DVD-R) or a Blu-ray® disc, in addition to or in alternative to the DVD-RW.

The medium I/F 922 controls reading or writing (storing) of data from or to a storage medium 921 such as a flash memory. The external device connection I/F 923 is an interface that connects the data acquisition apparatus 9 to an external PC 930 including a display, an operation receiving device, and a display controller. The timer 924 is a measurement device that has a time measurement function. The timer 924 may be a computer-based software timer. Hardware Configuration of Evaluation Apparatus FIG. 5 is a block diagram illustrating an example of a hardware configuration of the evaluation apparatus 3. Each hardware component of the evaluation apparatus 3 is denoted by a reference numeral in 300 series. As illustrated in FIG. 5, the evaluation apparatus 3 is implemented by a computer. Specifically, the evaluation apparatus includes a CPU 301, a ROM 302, a RAM 303, an HD 304, an HDD controller 305, a display 306, an external device connection I/F 308, a network I/F 309, a bus line 310, a keyboard 311, a pointing device 312, a DVD-RW drive 314, and a medium I/F 316.

The CPU 301 controls overall operation of the evaluation apparatus 3. The ROM 302 stores a program such as an IPL to boot the CPU 301. The RAM 303 is used as a work area for the CPU 301. The HD 304 stores various data such as programs. The HDD controller 305 controls reading or writing of various data to or from the HD 304 under control of the CPU 301. The display 306 displays various information such as a cursor, a menu, a window, characters, or an image. The display 306 is an example of a display (display device). The external device connection I/F 308 is an interface that connects the evaluation apparatus 3 to various external devices. Examples of the external devices include, but are not limited to, a USB memory and a printer. The network I/F 309 is an interface that controls communication of data with an external device through the communication network 100. The bus line 310 is an address bus or a data bus, which electrically connects the components illustrated in FIG. 5 such as the CPU 301.

The keyboard 311 is an example of input means (an input device) including multiple keys for inputting characters, numerical values, various instructions, and the like. The pointing device 312 is an example of an input device that allows a user to select or execute a specific instruction, select a target for processing, or move a cursor being displayed. The DVD-RW drive 314 controls reading or writing of various data to or from a DVD-RW 313, which is an example of a removable storage medium. The DVD-RW is merely one example of the removable storage medium. In another example, a digital versatile disk recordable (DVD-R) is used as the removable storage medium. The medium I/F 316 controls reading or writing (storing) of data from or to a storage medium 315 such as a flash memory. Hardware Configuration of Data Management Apparatus FIG. 5 is a block diagram illustrating an example of a hardware configuration of the data management apparatus 5. Each hardware component of the data management apparatus 5 is denoted by a reference numeral in 500 series. As illustrated in FIG. 5, the data management apparatus is implemented by a computer. As illustrated in FIG. 5, since the data management apparatus has the same configuration as the evaluation apparatus 3, the description of hardware configuration thereof is omitted below. Further, since each of the terminal apparatus 1100 and the terminal apparatus 1200 is also implemented by a computer and has the same or substantially the same configuration as that of the evaluation apparatus 3, the description of the hardware configuration thereof is omitted below.

Figure 6:
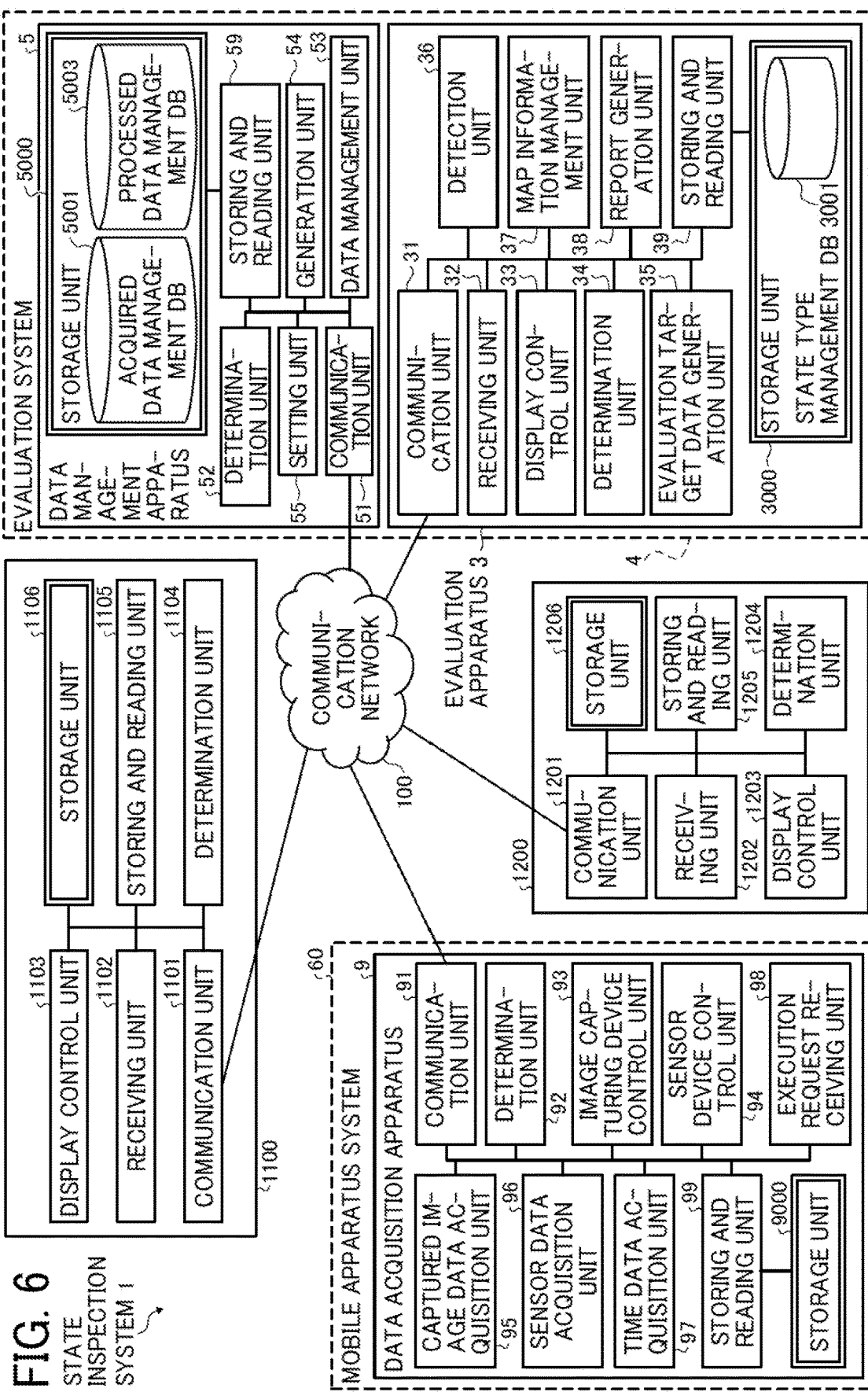
FIG. 6 is a block diagram illustrating an example of a functional configuration of the state inspection system according to an embodiment of the present disclosure.

For example, any one of the above-described programs is recorded in a file in a format installable or executable on a computer-readable storage medium for distribution. Examples of the storage medium include a compact disc recordable (CD-R), a DVD, a Blu-ray® disc, a secure digital (SD) card, and a USB memory. In addition, such storage medium may be provided in the domestic markets or foreign markets as program products. For example, the evaluation system 4 executes the program to implement an evaluation method according to the present disclosure. Functional Configuration Next, referring to FIG. 6, a functional configuration of the state inspection system 1 according to an embodiment is described. FIG. 6 is a block diagram illustrating an example of a functional configuration of the state inspection system 1, according to the first embodiment. FIG. 6 illustrates a part of the devices or apparatuses of FIG. 1, which are related to processes or operations described below. Functional Configuration of Data Acquisition Apparatus Referring to FIG. 6, a functional configuration of the data acquisition apparatus 9 is described. The data acquisition apparatus 9 includes a communication unit 91, a calculation unit 92, an image capturing device control unit 93, a sensor device control unit 94, a captured image data acquisition unit 95, a sensor data acquisition unit 96 (a position detector), a time data acquisition unit 97, a request receiving unit 98, and a storing and reading unit 99. These units are functions or means implemented by or caused to function by operating one or more hardware components illustrated in FIG. 4 in cooperation with instructions of the CPU 911 according to the program for the data acquisition apparatus loaded from the HD 914 to the RAM 913. The data acquisition apparatus 9 further includes a storage unit 9000 implemented by the ROM 912 and the HD 914 illustrated in FIG. 4. The external PC 930 illustrated in FIG. 4 connected to the data acquisition apparatus 9 illustrated includes a receiving unit and a display control unit.

The communication unit 91 is mainly implemented by the network I/F 916 that operates according to instructions of the CPU 911. The communication unit 91 communicates various data or information with other apparatuses or terminals through the communication network 100. For example, the communication unit 91 transmits acquired data acquired by the captured image data acquisition unit 95 and the sensor data acquisition unit 96 to the data management apparatus 5. The calculation unit 92, which is implemented by instructions of the CPU 911, performs various determinations.

The image capturing device control unit 93 is mainly implemented by the image capturing device I/F 901 that operates according to instructions of the CPU 911. The image capturing device control unit 93 control photographing processing by the image capturing device 7. The sensor device control unit 94 is mainly implemented by the sensor device I/F 902 that operates according to instructions of the CPU 911. The sensor device control unit 94 controls data acquisition processing for the sensor device 8. The image capturing device control unit 93 is an example of an angle change unit.

The captured image data acquisition unit 95 is mainly implemented by the image capturing device I/F 901 that operates according to instructions of the CPU 911. The captured image data acquisition unit 95 acquires captured image data corresponding to a captured image captured by the image capturing device 7. The sensor data acquisition unit 96 is mainly implemented by the sensor device I/F 902 that operates according to instructions of the CPU 911. The sensor data acquisition unit 96 acquires sensor data, which is a result of detection by the sensor device 8. The sensor data acquisition unit 96 is an example of a distance information acquisition unit and a location information acquisition unit. The time data acquisition unit 97 is mainly implemented by the timer 924 that operates according to instructions of the CPU 911. The time data acquisition unit 97 acquires time data that indicates a time at which the captured image data acquisition unit 95 or the sensor data acquisition unit 96 acquires data.

The request receiving unit 98 is mainly implemented by the external device connection I/F 923 that operates according to instructions of the CPU 911. The request receiving unit 98 receives a request from, for example, the external PC 930.

The storing and reading unit 99, which is implemented mainly by instructions of the CPU 911, stores various data (or information) in the storage unit 9000 or reads various types of data (or information) from the storage unit 9000. Functional Configuration of Evaluation Apparatus Referring to FIG. 6, a functional configuration of the evaluation apparatus 3 is described. The evaluation apparatus 3 includes a communication unit 31, a receiving unit 32, a display control unit 33, a determination unit 34, an evaluation target data generation unit 35, a detection unit 36, a map data management unit 37, a report generation unit 38, and a storing and reading unit 39. These units are functions or means implemented by or caused to function by operating one or more hardware components illustrated in FIG. 5 in cooperation with instructions of the CPU 301 according to the program for the evaluation apparatus loaded from the HD 304 to the RAM 303. The evaluation apparatus 3 further includes a storage unit 3000 implemented by the ROM 302 and the HD 304 illustrated in FIG. 5.

The communication unit 31 is mainly implemented by the network I/F 309 that operates according to instructions of the CPU 301. The communication unit 31 communicates various data or information with other apparatuses or terminals through the communication network 100. For example, the communication unit 31 transmits and receives various data relating to an evaluation of a slope state to and from the data management apparatus 5.

The receiving unit 32 is mainly implemented by the keyboard 311 or the pointing device 312 that operates according to instructions of the CPU 301. The receiving unit 32 receives various selections or inputs from the user. The receiving unit 32 receives various selections or inputs on an evaluation screen 400 described below. The display control unit 33, which is mainly implemented by the instructions of the CPU 301, controls the display 306 to display various images. The display control unit 33 controls the display 306 to display the evaluation screen 400 described below. The determination unit 34, which is implemented by instructions of the CPU 301, performs various determinations. The receiving unit 32 is an example of an operation receiving unit.

The evaluation target data generation unit 35, which is implemented by instructions of the CPU 301, generates data to be evaluated. In the following description, the data to be evaluated may be referred to "evaluation target data." The detection unit 36, which is mainly implemented by instructions of the CPU 301, performs processing of detecting a state of the slope using the evaluation target data generated by the evaluation target data generation unit 35. The map data management unit 37, which is mainly implemented by instructions of the CPU 301, manages map information acquired from, for example, an external server. The map information includes location information at a certain position on a map.

The report generation unit 38, which is mainly implemented by instructions of the CPU 301, generates an evaluation report to be submitted to the entity in charge of roads based on the evaluation result.

The storing and reading unit 39, which is implemented mainly by instructions of the CPU 301, stores various data (or information) in the storage unit 3000 or reads various types of data (or information) from the storage unit 3000.
Functional Configuration of Data Management Apparatus: Referring to FIG. 6, a functional configuration of the data management apparatus 5 is described. The data management apparatus 5 includes a communication unit 51, a determination unit 52, a data management unit 53, and a storing and reading unit 59. These units are functions or means implemented by or caused to function by operating one or more hardware components illustrated in FIG. 5 in cooperation with instructions of the CPU 501 according to the program for the data management apparatus loaded from the HD 504 to the RAM 503. The data management apparatus 5 further includes a storage unit 5000 implemented by the ROM 502 and the HD 504 illustrated in FIG. 5.

The communication unit 51 is mainly implemented by the network I/F 509 that operates according to instructions of the CPU 501. The communication unit 51 communicates various data or information with other apparatuses or terminals through the communication network 100. For example, the communication unit 51 receives captured image data and sensor data transmitted from the data acquisition apparatus 9. Further, the communication unit 51 transmits and receives various data relating to, for example, the evaluation of the slope state to and from the evaluation apparatus 3. The communication unit 51 is an example of an instruction receiving unit. The determination unit 52, which is implemented by instructions of the CPU 501, performs various determinations. The determination unit 52 is an example of is a position generation unit.

The data management unit 53, which is mainly implemented by instructions of the CPU 501, manages various data relating to the evaluation of a slope state. For example, the data management unit 53 registers the captured image data and the sensor data transmitted from the data acquisition apparatus 9 in an acquired data management database (DB) 5001. Further, the data management unit 53 registers, for example, data processed or generated by the evaluation apparatus 3 in a processed data management DB 5003. The generation unit 54, which is mainly implemented by instructions of the CPU 501, generates image data relating to a slope.

The storing and reading unit 59, which is implemented mainly by instructions of the CPU 501, stores various data (or information) in the storage unit 5000 or reads various types of data (or information) from the storage unit 5000.
Functional Configuration of Terminal Apparatus Referring to FIG. 6, a functional configuration of the terminal apparatus 1100 is described. The terminal apparatus 1100 includes a communication unit 1101, a receiving unit 1102, a display control unit 1103, a determination unit 1104, and a storing and reading unit 1105. These units are functions or means implemented by or caused to function by operating one or more hardware components illustrated in FIG. 5 in cooperation with instructions of the CPU according to the program for the terminal apparatus loaded from the HD to the RAM. The data management apparatus 5 further includes a storage unit 1106 implemented by the ROM and the HD illustrated in FIG. 5.

The communication unit 1101 is mainly implemented by the network I/F that operates according to instructions of the CPU. The communication unit 1101 communicates various data or information with other apparatuses or terminals through the communication network 100.

The receiving unit 1102 is mainly implemented by the keyboard or the pointing device that operates according to instructions of the CPU. The receiving unit 1102 receives various selections or inputs from the user. The display control unit 1103, which is mainly implemented by the instructions of the CPU, controls the display of the terminal apparatus 1100 to display various images. The determination unit 1104, which is implemented by instructions of the CPU 301, performs various determinations. The receiving unit 1102 is an example of an operation receiving unit.

The storing and reading unit 1105, which is implemented mainly by instructions of the CPU, stores various data (or information) in the storage unit 1106 or reads various types of data (or information) from the storage unit 1106.

Referring to FIG. 6, a functional configuration of the terminal apparatus 1200 is described. The terminal apparatus 1200 includes a communication unit 1201, a receiving unit 1202, a display control unit 1203, a determination unit 1204, and a storing and reading unit 1205. These units are functions or means implemented by or caused to function by operating one or more hardware components illustrated in FIG. 5 in cooperation with instructions of the CPU according to the program for the terminal apparatus loaded from the HD to the RAM. The data management apparatus 5 further includes a storage unit 1206 implemented by the ROM and the HD illustrated in FIG. 5.

The communication unit 1201 is mainly implemented by the network I/F that operates according to instructions of the CPU. The communication unit 1201 communicates various data or information with other apparatuses or terminals through the communication network 100.

The receiving unit 1202 is mainly implemented by the keyboard or the pointing device that operates according to instructions of the CPU. The receiving unit 1202 receives various selections or inputs from the user. The display control unit 1203, which is mainly implemented by the instructions of the CPU, controls the display of the terminal apparatus 1200 to display various images. The determination unit 1204, which is implemented by instructions of the CPU 301, performs various determinations.

The storing and reading unit 1205, which is implemented mainly by instructions of the CPU, stores various data (or information) in the storage unit 1206 or reads various types of data (or information) from the storage unit 1206. State Type Management Table: FIG. 7 and FIG. 8 are illustrations of an example of a state type management table. The state type management table is a table for managing training data for detecting a state type of a slope. In the storage unit 3000, a state type management DB 3001 is stored, for example, in the form of the state type management table as illustrated in FIG. 7 and FIG. 8. The state type management table stores, for each of type numbers, a type name indicating a state type, a training image, and remarks in association with one another.

The type name is a name indicating a state type that identifies the state of a slope, a physical quantity around the slope, and site information. In the embodiment, the state type includes a type of the slope itself including a structure such as a retaining wall, a slope retaining frame, spray mortar, a wire mesh, a fence, a drainage hole, a pipe, and a drainage channel of a small step. The state type further includes a type indicating a physical quantity around the slope such as inflow water, moss, plants, rockfall, earth and sand, and sunshine. The state type further includes, as the site information that supports data acquisition by the mobile apparatus system 60, a type such as a pole, a utility pole, a sign, and a signboard. The state type may further include, as supplementary information on the structure, landmark information such as a mark made with chalk indicating the presence of deformation, an artificial object such as a measurement device or a trace of countermeasure, which was provided at a past inspection or construction. The training image is an example of the training data. The training image is used for machine learning for determining the state type of the slope, the physical quantity around the slope, and the site information based on captured image data. In the embodiment, the training data is not limited to a brightness image or an RGB image, which is generally referred to as an image. The training data may be depth information, text, or voice, provided that it contains information based on which the state type is identified. In the remarks, information as a detection criterion for detecting the state type is described. Acquired Data Management Table: FIG. 9A is an illustration of an example of an acquired data management table. The acquired data management table is a table for managing various acquired data acquired by the data acquisition apparatus 9. In the storage unit 5000, the acquired data management DB 5001 is stored, for example, in the form of the acquired data management table as illustrated in FIG. 9A. The acquired data management table stores, for each of folders, captured image data, sensor data, and acquisition time in association with one another.

The captured image data and the sensor data are data files of the acquired data transmitted from the data acquisition apparatus 9. The acquisition time indicates a time at which the captured image data and the sensor data are acquired by the data acquisition apparatus 9. Data acquired in one inspection process is stored in the same folder. The captured image data and the three-dimensional sensor data included in the sensor data are stored in association with coordinates, as described below. The captured image data and the three-dimensional sensor data included in the sensor data is stored in association with positioning data included in the sensor data. With this configuration, in response to selection of a desired position in the map information managed by the map data management unit 37 of the evaluation apparatus 3, the captured image data and the three-dimensional sensor data at the selected position is read from the acquired data management DB 5001. Processed Data Management Table: FIG. 9B is an illustration of an example of a processed data management table. The processed data management table is a table for managing various processed data processed by the evaluation apparatus 3. In the storage unit 5000, the processed data management DB 5003 is stored, for example, in the form of the processed data management table as illustrated in FIG. 9B. The processed data management table stores, for each of folders, the evaluation target data, evaluation data, positioning data, and comment in association with one another.

The evaluation target data is a data file used for detection and evaluation of a slope state by the evaluation apparatus 3. The evaluation data is a data file indicating an evaluation result obtained by the evaluation apparatus 3. The positioning data is data indicating location information measured by the GNSS sensor 8b. The comment is reference information input by an evaluator for the evaluation target data or the evaluation data. With this configuration, in response to selection of a desired position in the map information managed by the map data management unit 37 of the evaluation apparatus 3, the evaluation data at the selected position is read from the processed data management DB 5003.

The data acquisition unit according to the embodiments, further includes: a position detector to detect a position of the vehicle on which the image capturing device is installed. The circuitry changes the Scheimpflug angle based on the position detected by the position detector.

Figure 10:
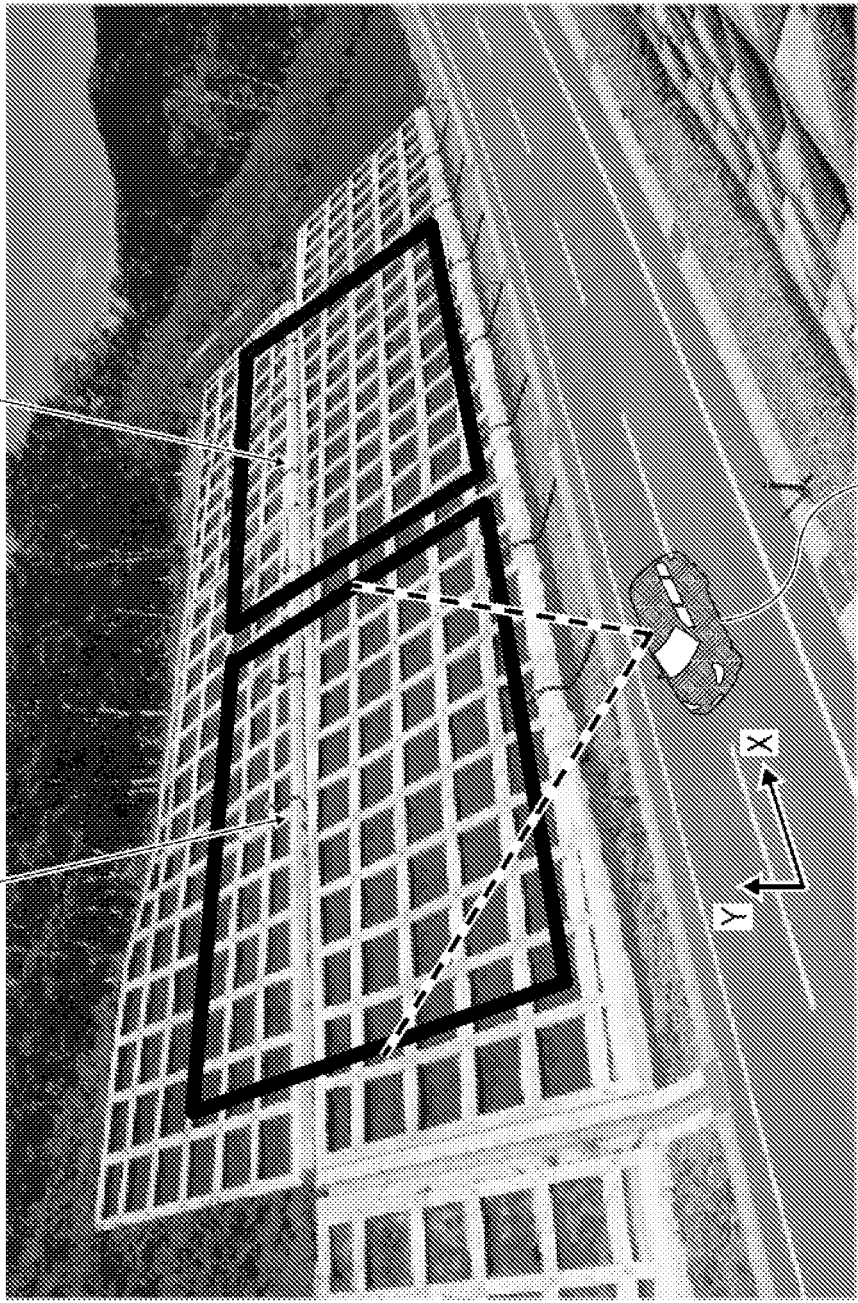
FIG. 10 is an illustration for describing a captured image acquired by the mobile apparatus system according to an embodiment of the present disclosure.

FIG. 10 is an illustration for describing a captured image acquired by the mobile apparatus system 60.

The mobile apparatus system 60 photographs a slope on a road using the image capturing device 7 of the data acquisition apparatus 9 while the mobile apparatus 6 (e.g., vehicle) travels. An X-axis direction illustrated in FIG. 10 indicates a moving direction of the mobile apparatus 6 (e.g., vehicle), and a Y-axis direction indicates a vertical direction. A depth direction toward the slope from the mobile apparatus 6 (e.g., vehicle) is a Z-axis direction, the Z-axis direction being orthogonal to the X-axis direction and the Y-axis direction.

In the data acquisition unit according to the embodiments, the central axis of the image capturing lens on the vehicle intersects a moving direction of the vehicle.

As illustrated in FIG. 10, the data acquisition apparatus 9 acquires a captured image 1, a distance measurement image 1, a captured image 2, and a distance measurement image 2 in a chronological order as the mobile apparatus 6 (e.g., vehicle) travels. The distance measurement image 1 and the distance measurement image 2 are images acquired by the distance sensor 8a. As time synchronization is performed on the image capturing device 7 and the sensor device 8, the captured image 1 and the distance measurement image 1 are images for the same area of the slope, and the captured image 2 and the distance measurement image 2 are images of another same area of the slope. Further, tilt correction (image correction) is performed on the captured image based on the posture of the vehicle at the time when the captured image is photographed, and the image data and the positioning data (north latitude and east longitude) are associated with each other based on the time when the captured image is photographed.

Thus, the mobile apparatus system 60 acquires the captured image data obtained by photographing the slope and the sensor data acquired in accordance with photographing by the image capturing device 7 while the vehicle as the mobile apparatus 6 (e.g., vehicle) travels. The mobile apparatus system 60 uploads the acquired captured image data and sensor data to the data management apparatus 5.

Figure 11A:
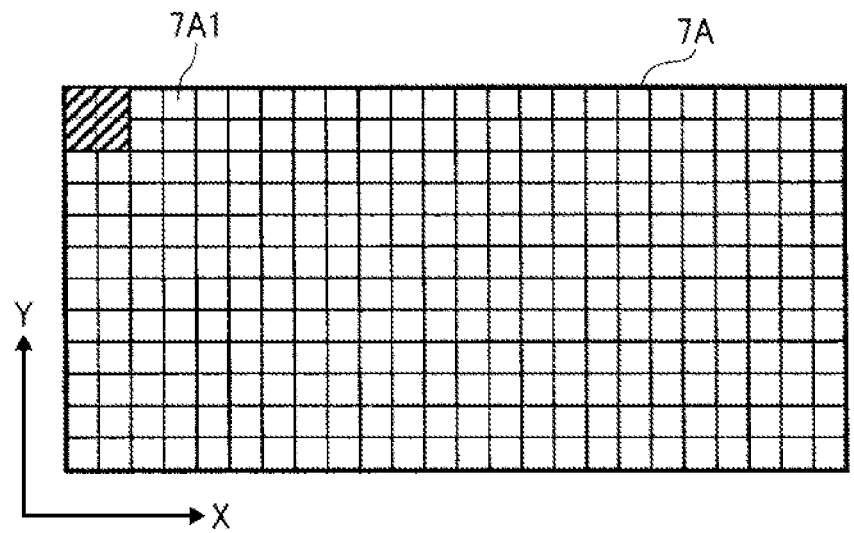
FIG. 11A is an illustration for describing a captured image according to an embodiment of the present disclosure.
Figure 11B:
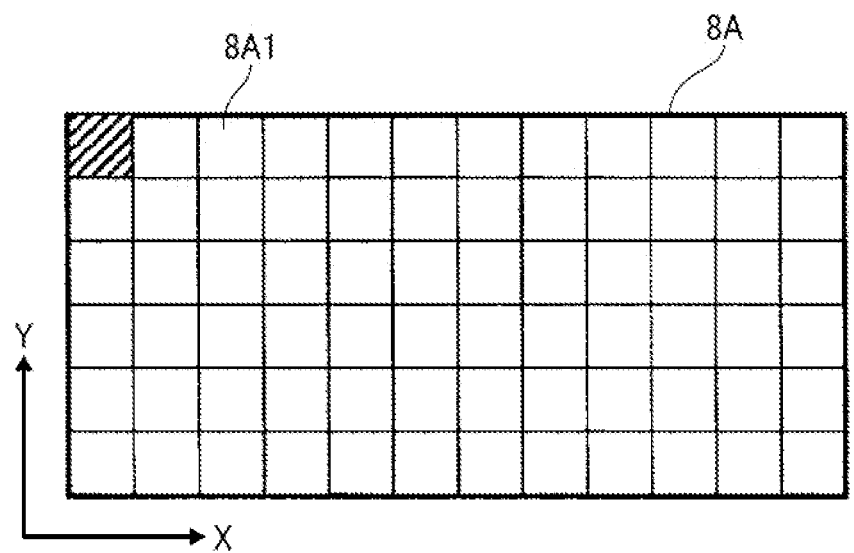
FIG. 11B is an illustration for describing a distance measurement image according to an embodiment of the present disclosure.

FIG. 11A and FIG. 11B are illustrations for describing the captured image and the distance measurement image.

FIG. 11A illustrates captured image data 7A of the captured image 1 or the captured image 2 illustrated in FIG. 10. Pixels 7A1s of the captured image data 7A acquired by the image capturing device 7 are arranged at coordinates corresponding to the X-axis direction and the Y-axis direction illustrated in FIG. 10. Each pixel 7A1 has brightness information corresponding to an amount of stored electricity.

The brightness information of the pixels 7A1s of the captured image data 7A is stored in the storage unit 5000 as the captured image data illustrated in FIG. 9A and FIG. 9B in association with coordinates corresponding to the X-axis direction and the Y-axis direction illustrated in FIG. 10.

FIG. 11B illustrates distance measurement image data 8A of the distance measurement image 1 or the distance measurement image 2 illustrated in FIG. 10. Pixels 8A1s of the distance measurement image data 8A acquired by the distance sensor 8a are arranged at coordinates corresponding to the X-axis direction and the Y-axis direction illustrated in FIG. 10. Each pixel 8A1 has distance information in the Z-axis direction illustrated in FIG. 10 corresponding to an amount of stored electricity. The distance measurement image data 8A is three-dimensional point group data. The three-dimensional point group data is referred to as the "distance measurement image data," since in typical cases, the three-dimensional point group data is displayed in a visually recognizable manner by adding the brightness information so that the three-dimensional point group data is visually perceptible to a user. The captured image data 7A and the distance measurement image data 8A are collectively referred to as "image data."

A data acquisition unit includes: the image capturing device according to the embodiments; and a distance sensor to measure a distance between the image capturing device and the object surface. The circuitry changes the Scheimpflug angle based on the distance measured by the distance sensor.

Distance information of each pixel 8A1 of the distance measurement image data 8A is stored in the storage unit 5000 as three-dimensional information included in the sensor data illustrated in FIG. 9 in association with coordinates corresponding to the X-axis direction and the Y-axis direction illustrated in FIG. 10.

Since the captured image data 7A illustrated in FIG. 11A and the distance measurement image data 8A illustrated in FIG. 11B are images of the same area of the slope, the brightness information and the distance information are stored in the storage unit 5000 in association with the coordinates corresponding to the X-axis direction and the Y-axis direction illustrated in FIG. 10. Processes or Operation of Embodiment Operation of Acquiring Data Next, referring to FIG. 12 and FIG. 10, an operation of acquiring data using the mobile apparatus system 60 is described. An inspection technician of a slope state photographs slopes on a road as he/she rides on the mobile apparatus 6 (e.g., vehicle), and uploads acquired data to the data management apparatus 5. The details are described below.

FIG. 12 is a sequence diagram illustrating an example of an operation of acquiring data using the mobile apparatus system 60. First, in response to a predetermined input operation by an inspection technician to the external PC 330, the request receiving unit 98 of the data acquisition apparatus 9 receives a data acquisition start request (step S11). The data acquisition apparatus 9 performs data acquisition processing using the image capturing device 7 and the sensor device 8 (step S12). Specifically, the image capturing device control unit 93 sends a photographing request to the image capturing device 7, to start photographing processing for a particular area. Further, the sensor device control unit 94 starts detection processing by the distance sensor 8a and the GNSS sensor 8b in synchronization with the photographing processing by the image capturing device 7. The captured image data acquisition unit 95 acquires captured image data obtained by the image capturing device 7, and the sensor data acquisition unit 96 acquires sensor data obtained by the distance sensor 8a and the GNSS sensor 8b. The time data acquisition unit 97 acquires time data indicating times at which various data including the captured image data and the sensor data are acquired by the captured image data acquisition unit 95 and the sensor data acquisition unit 96.

Figure 13:
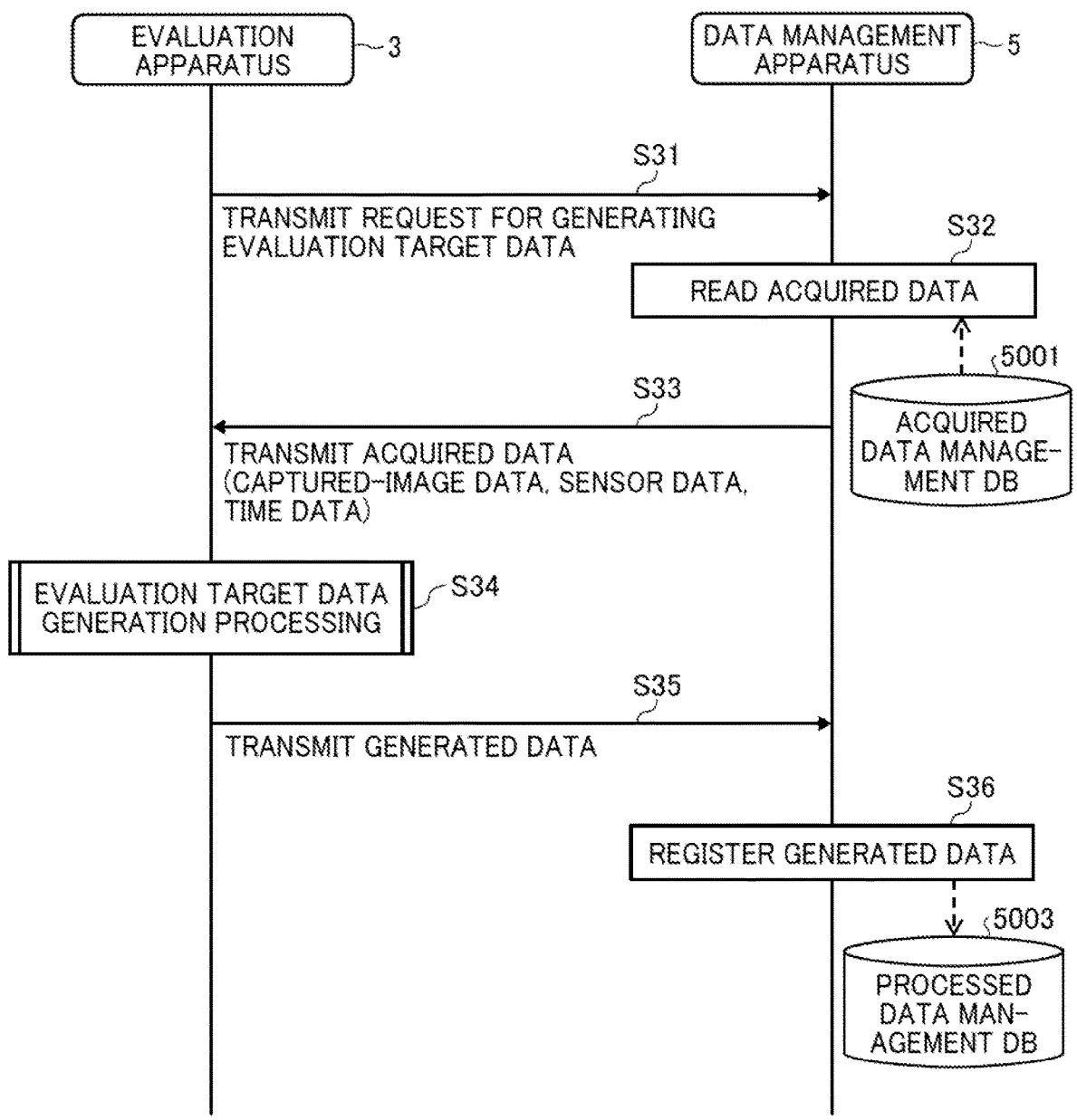
FIG. 13 is a sequence diagram illustrating an example of an operation of generating evaluation target data according to an embodiment of the present disclosure.

Next, in response to a predetermined input operation by the inspection technician to the external PC 330, the request receiving unit 98 receives an upload request that request an upload of the acquired various data (step S13). The communication unit 91 uploads (transmits) the captured image data, the sensor data, and the time data, which are acquired data acquired in step S12, to the data management apparatus 5 (step S14). Thus, the communication unit 51 of the data management apparatus 5 receives the acquired data transmitted from the data acquisition apparatus 9. The data management unit 53 of the data management apparatus 5 registers the acquired data received in step S14 in the acquired data management DB 5001 (see FIG. 9A) (step S15). The data management unit 53 stores the captured image data and the sensor data in one folder in association with the time data indicating the acquisition time of each data included in the acquired data. Operation of Evaluating Slope State Generation of Evaluation Target Data FIG. 13 is a sequence diagram illustrating an example of an operation of generating the evaluation target data.

First, the communication unit 31 of the evaluation apparatus 3 transmits a generation request that requests generation of evaluation target data to the data management apparatus 5 (step S31). The generation request includes a name of a folder in which data as a generation target is stored. Thus, the communication unit 51 of the data management apparatus 5 receives the generation request transmitted from the evaluation apparatus 3.

Next, the data storing and reading unit 59 of the data management apparatus 5 searches the acquired data management DB 5001 using the folder name included in the generation request received in step S31 as a search key, to read acquired data associated with the folder name included in the generation request (step S32). Next, the communication unit 51 transmits the acquired data read in step S32 to the evaluation apparatus 3 (step S33). This acquired data includes captured image data, sensor data, and time data. Thus, the communication unit 31 of the evaluation apparatus 3 receives the acquired data transmitted from the data management apparatus 5.

Next, the evaluation target data generation unit 35 of the evaluation apparatus 3 generates evaluation target data using the acquired data received in step S33 (step S34). Specifically, the evaluation target data generation unit 35 corrects a tilt of the captured image data according to the posture of the image capturing device 7 or the mobile apparatus 6 (e.g., vehicle) at the time when the captured image is photographed based on the received sensor data obtained by the distance sensor 8a. Further, the evaluation target data generation unit associates positioning data, which is the received sensor data obtained by the GNSS sensor 8b with the captured image data, based on the received time information. Furthermore, the evaluation target data generation unit 35 performs processing synthesizing multiple pieces of captured image data into one piece of image data.

As described, the evaluation target data generation unit 35 has a tilt correction function for image data, an associating function for associating image data with location information, and a synthesis function for image data. The evaluation target data generation unit 35 performs image correction on the received captured image data by using the acquired data received from the data management apparatus 5, to facilitate processing by the detection unit 36 and the report generation unit 38 described below.

The communication unit 31 of the evaluation apparatus 3 transmits the generated data generated in step S34 to the data management apparatus 5 (step S35). The generated data includes the evaluation target data generated by the evaluation target data generation unit 35, the positioning data, and the comment. Thus, the communication unit 51 of the data management apparatus 5 receives the generated data transmitted from the evaluation apparatus 3. Next, the data management unit 53 of the data management apparatus 5 stores the generated data received in step S35 in the processed data management DB 5003 (see FIG. 9B) (step S36). Specifically, the data management unit 53 stores the evaluation target data, the positioning data, and the comment included in the generated data in one folder in association with each other.

Figure 14:
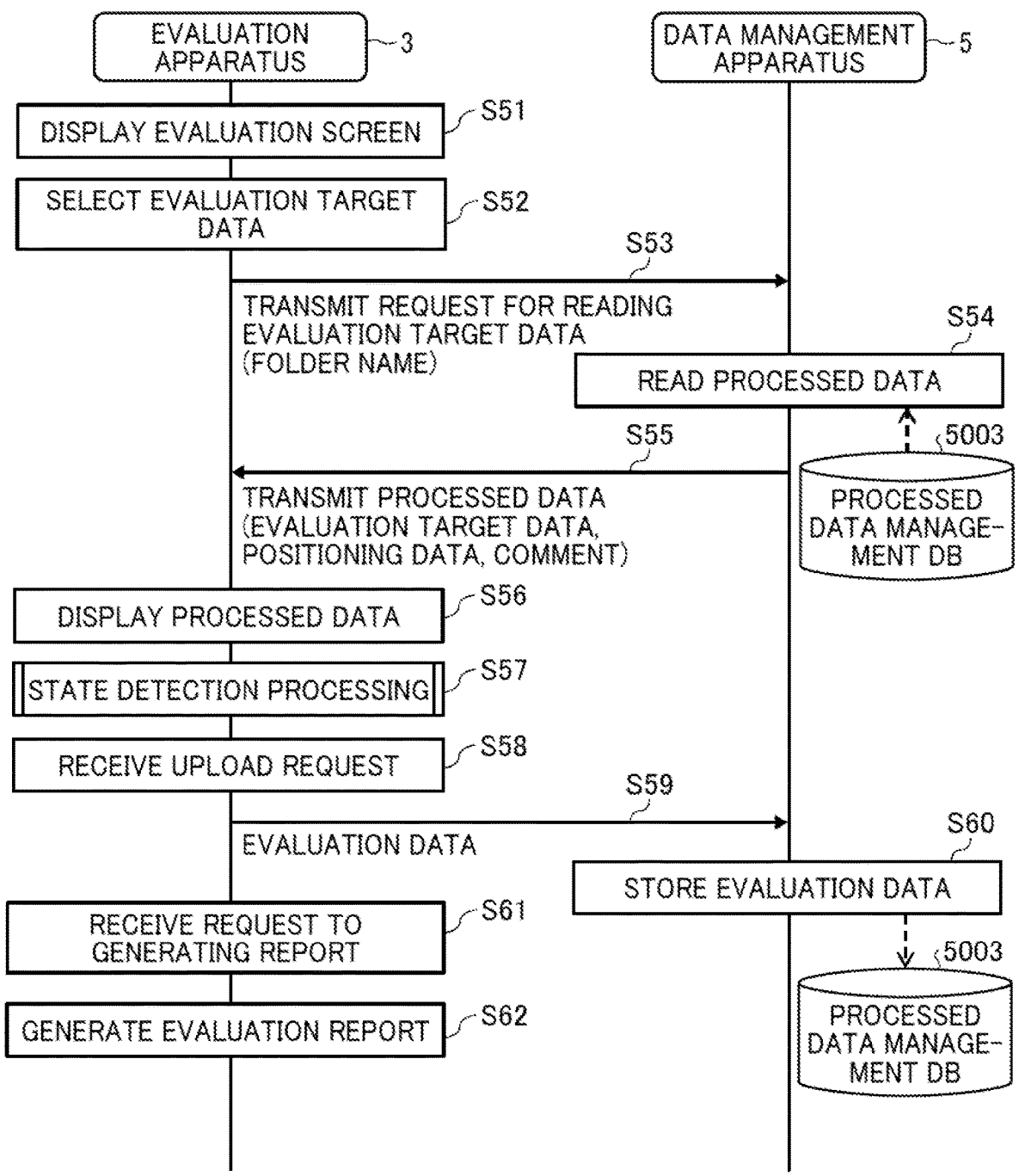
FIG. 14 is a sequence diagram illustrating an example of an operation of generating a report, which is an evaluation result of a slope state, according to an embodiment of the present disclosure.

Thus, the evaluation system 4 performs image processing based on the various data including the captured image data, the sensor data, and the time data acquired from the data acquisition apparatus 9 to generate evaluation target data to be used for evaluation of a slope state. Generation of Evaluation Report FIG. 14 is a sequence diagram illustrating an example of an operation of generating a report, which is an evaluation result of a slope state.

First, the display control unit 33 of the evaluation apparatus 3 controls the display 306 to display the evaluation screen 400 for performing evaluation processing of the slope state (step S51).

Next, in response to designation of a desired folder by the evaluator using the "designate folder" button 411, the receiving unit 32 of the evaluation apparatus 3 receives selection of evaluation target data (step S52).

Next, the communication unit 31 transmits a read request that request reading of the evaluation target data selected in step S52 to the data management apparatus 5 (step S53). This read request includes the folder name selected in step S52. Thus, the communication unit 51 of the data management apparatus 5 receives the read request transmitted from the evaluation apparatus 3.

Next, the data storing and reading unit 59 of the data management apparatus 5 searches the processed data management DB 5003 (see FIG. 9B) using the folder name included in the read request received in step S53 as a search key, to read processed data associated with the folder name included in the read request (step S54). Next, the communication unit 51 transmits the processed data read in step S54 to the evaluation apparatus 3 (step S55). The processed data includes the evaluation target data, the positioning data, and the comment. Thus, the communication unit 31 of the evaluation apparatus 3 receives the processed data transmitted from the data management apparatus 5.

Next, the display control unit 33 of the evaluation apparatus 3 controls the display 306 to display the input/output screen received in step S94 (step S95).

Next, the evaluation apparatus 3 performs detection processing of a slope state using the evaluation target data (step S57). A detailed description is given later of the slope state.

Referring again to FIG. 14, in response to pressing of the "Upload" button 491 in the evaluation screen 400 by the evaluator, the receiving unit 32 receives an upload request that requests an upload of the evaluation result (step S58). The communication unit 31 uploads (transmits) the evaluation result to the data management apparatus 5 (step S59). Thus, the communication unit 51 of the data management apparatus 5 receives the evaluation data transmitted from the evaluation apparatus 3. The data management unit 53 of the data management apparatus 5 registers the evaluation data received in step S59 in the processed data management DB 5003 (see FIG. 9B) (step S60). In this case, the data management unit 53 stores the evaluation data in one folder in association with the evaluation target data on which the evaluation has been performed.

Further, the receiving unit 32 receives a request for generating an evaluation report (step S61). The report generation unit 38 generates an evaluation report based on the detection result of the slope state by the detection unit 36 (step S62). The report generation unit 38 generates an evaluation report by arranging the evaluation data indicating the above-described evaluation result according to an inspection guideline issued by, for example, the government, of in format requested by the entity in charge of roads.

Figure 15:
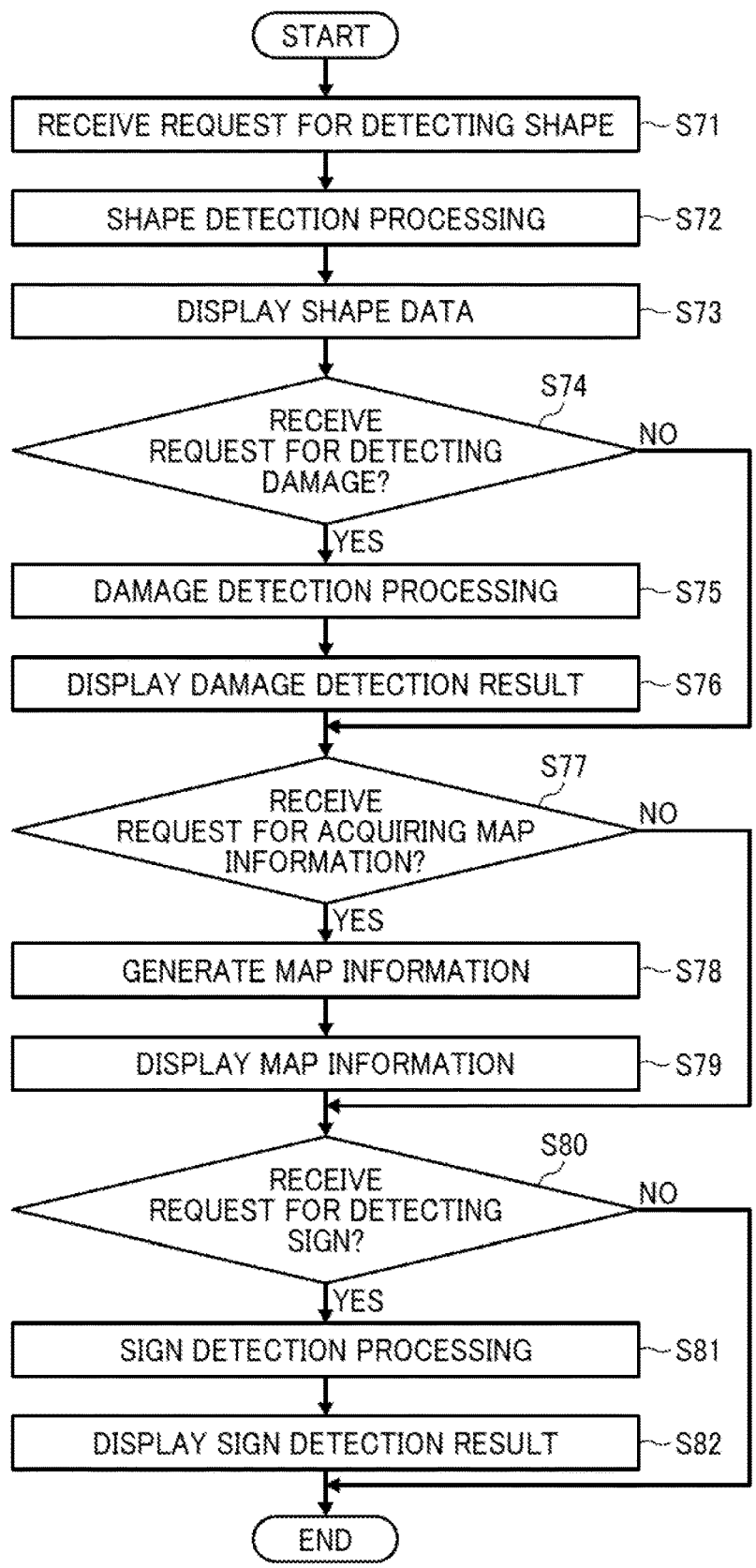
FIG. 15 is a flowchart of an example of detection processing of a slope state according to an embodiment of the present disclosure.

Referring to FIG. 15, details of the detection processing of the slope state are described. FIG. 15 is a flowchart of an example of the detection processing of the slope state.

First, the receiving unit 32 receives a shape detection request (step S71). Next, the detection unit 36 performs shape detection processing using the evaluation target data (step S72). In the embodiment, shape data indicating a shape of the slope is represented by, for example, three-dimensional information such as an extension, a height, and an inclination angle of the slope, and location information. The extension of the slope is a length of the slope in a plan view, in other words, a length in a depth direction of a cross section based on which the inclination of the slope is recognizable. The shape data further includes information indicating the type of slope, i.e., whether the slope is a natural slope or an earthwork structure. When the slope is an earthwork structure, the shape data includes information on the type of the earthwork structure. Examples of the type of an earthwork structure include, but are not limited to, a retaining wall, a slope retaining frame, mortar spraying, a presence or absence of an anchor, and an embankment.

Specifically, the detection unit 36 detects the extension, the height, and the inclination angle of the slope based on the image data and the three-dimensional data included in the evaluation target data. Further, the detection unit 36 detects the type of the slope in an image, which is the evaluation target data, using the state type management DB 3001 (see FIG. 7). In this case, the detection unit 36 detects the type of the slope by image matching processing using the training images indicated in the state type management table.

Next, the display control unit 33 controls the display 306 to display the shape information, which is the detection result in step S72, on the display 306 (step S73). In steps S71 to S73 described above, "structure information detection" processing may be performed instead of the "shape detection" processing.

In this case, the receiving unit 32 receives a structure information detection request (step S71). Next, the detection unit 36 performs structure information detection processing using the evaluation target data (step S72). Then, the display control unit 33 controls the display 306 to display structure information detection information, which is the detection result in step S72, on the display 306 (step S73).

In the embodiment, the structure information includes supplementary information of a structure in addition to the shape data described above. Specifically, the detection unit 36 detects the type of the slope in an image, which is the evaluation target data, and the type of the supplementary information of the slope, using the state type management DB 3001 (see FIG. 7 and FIG. 8), based on the image data and the three-dimensional data included in the evaluation target data. In this case, the detection unit 36 detects the type of the slope and the supplementary information of the slope by image matching processing using the training images indicated in the state type management table.

Next, in a case where the receiving unit 32 receives a damage detection request that requests detection of a damage of the slope state (YES in step S74), the operation proceeds to step S75. By contrast, when the receiving unit 32 receives no damage detection request is received (NO in step S74), the operation proceeds to step S77. The detection unit 36 performs damage detection processing of a slope state on the evaluation target data (step S75).

In the embodiment, in the damage detection processing of the state of the slope, a presence or absence of deformation in the slope or a degree of the deformation is detected as damage data indicating a degree of damage of the slope. The degree of the deformation indicates a degree of deterioration of the deformation, such as a width of a crack, a size of a separation, or a size of a floating. The detection unit 36 detects the presence or absence of deformation in the slope or the degree of the deformation based on the image data and the sensor data included in the evaluation target data. Further, the detection unit 36 detects whether the degree of deformation exceeds a predetermined value using, for example, a detection equation that is set in advance for obtaining a degree of deterioration of deformation. In this case, the detection unit 36 determines, for example, whether the width of the crack is equal to or greater than a certain value, whether the size of the separation is equal to or greater than a certain value, or whether the floating is large.

Then, in step S36 of FIG. 13, the data management unit 53 of the data management apparatus 5 stores, in the processed data management DB 5003, coordinates of the damage position and the type of the damage in association with coordinates corresponding to the X-axis direction and the Y-axis direction in the captured image data 7A illustrated in FIG. 11A.

Next, the display control unit 33 controls the display 306 to display a display screen indicating the damage detection result in step S75 (step S76).

The display control unit 33 controls the display 306 to display the cross-sectional image. The cross-sectional image includes a cross-sectional image of the slope as the evaluation target drawn based on the shape data detected by the detection unit 36. Since the shape data is detected using the sensor data obtained by the distance sensor 8*a* (three-dimensional sensor), the cross-sectional image can express three-dimensional information such as the inclination or height of the slope, which cannot be calculated only from the two-dimensional image.

Next, in a case where the receiving unit 32 receives a map information acquisition request (YES in step S77), the operation proceeds to step S78. By contrast, when the receiving unit 32 receives no map information acquisition request (NO in step S77), the operation ends. The detection unit 36 generates map information indicating a location of the slope state as the evaluation target (step S78). Specifically, the detection unit 36 generates map information in which an image indicating the location is added to the location (north latitude, east longitude) indicated by the positioning data acquired in step S55, which corresponds to map data available using a predetermined service or application provided by, for example, an external web server. The map data provided from the external web server is managed by the map data management unit 37.

Next, the display control unit 33 controls the display 306 to display the map information 490 generated in step S78 (step S79).

In a case where the receiving unit 32 receives a sign detection request that requests detection of a sign of a damage of the slope state (YES in step S80), the operation proceeds to step S81. By contrast, when the receiving unit 32 receives no sign detection request is received (NO in step S80), the operation ends. The detection unit 36 performs a sign detection process of a slope state on the evaluation target (step S82).

As known in the art, when a deformation on a slope is observed, the state inspection system 1 identifies a state and a position of the deformation. However, a point of view is not known according to which information indicating a sign of a position where a deformation occurs is measured before the deformation occurs on the slope. In the embodiment, in sign detection processing of detecting a sign of damage of a slope state, a sign of deformation of the slope is detected based on measurement data of the slope including surrounding data indicating a physical quantity around the slope as sign data indicating a sign of damage of the slope.

The measurement data includes captured image data obtained by photographing the slope by the image capturing device 7, or the sensor data obtained by measuring the slope by a three-dimensional sensor such as the distance sensor 8*a*.

The surrounding data includes measurement data of an object other than the slope. The object other than the slope includes at least one of inflow water, earth and sand, rocks, and plants.

The measurement data of the slope including surrounding data indicating inflow water is occurring on the surface of the slope indicates a possibility that accumulated water are applying pressure from the back side of the slope. Thus, the presence of the sign of deformation of the slope is detected. Specifically, the presence of the sign of deformation of the slope is detected according to an amount, a type, and a position of inflow water in addition to the presence to the inflow water.

The measurement data of the slope including surrounding data indicating plants and moss are growing on the surface of the slope indicates a possibility that accumulated water is occurring and the accumulated water are applying pressure from the back side of the slope. Thus, the presence of the sign of deformation of the slope is detected. Specifically, the presence of the sign of deformation of the slope is detected according to amounts, types, and positions of plants and moss in addition to the presence to the plants and moss.

The measurement data of the slope including surrounding data indicating fallen rocks or earth and sand around the slope indicates a possibility of abnormality occurring on the back side and the upper side of the slope. Thus, the presence of the sign of deformation of the slope is detected. Specifically, the presence of the sign of deformation of the slope is detected according to an amount, a type, and a position of fallen rocks or earth and sand in addition to the presence to the fallen rocks or earth and sand.

The measurement data of the slope including surrounding data indicating clogging of a drainage hole, a pipe, and a drainage channel in a small step indicates a possibility that drainage from the back side to the front side of the slope is blocked, and accumulated water are applying pressure from the back side of the slope. Thus, the presence of the sign of deformation of the slope is detected. Specifically, the presence of the sign of deformation of the slope is detected according to an amount, a type, and a position of material that leads to the clogging in addition to the presence to the clogging.

When a drainage hole, a pipe, or a drainage channel of small step itself is damaged, such damage is detected as a deformation of the slope. On the other hand, clogging of a drainage hole, a pipe, or a drainage channel of a small step is detected as a sign of deformation of the slope, instead of deformation of the slope.

With regard to the measurement data of an object other than the slope described above, a sign of deformation of the slope may be detected according to a combination of multiple measurement data. Specifically, when there is surrounding data indicating that inflow water is occurring only in a small part of the slope and when moss spreads over the entire surface of the slope, inflow water is likely to spread over the entire surface of the slope. Thus, the presence of a sign of the deformation of the slope is detected.

The surrounding data includes measurement data of physical quantities other than the object. The measurement data of physical quantities other than the object includes measurement data of light.

When the measurement data of the slope includes surrounding data indicating the degree of sunshine, such the surrounding data is used for detection of the presence of a sign of deformation of the slope in combination with the measurement data of the object other than the slope. Specifically, moss growing in a sunny spot where the slope is easily dried indicates a possibility that inflow water is occurring, and accumulated water is applying pressure from the back side of the slope. Thus, the presence of the sign of deformation of the slope is detected.

The sign detection processing of detecting a sign of damage of a slope state generates a comment on a sign of deformation of the slope based on the measurement data of the slope including the surrounding data indicating the physical quantity around the slope as the sign data indicating a sign of damage of the slope. In step S36 of FIG. 13, the data management unit 53 of the data management apparatus 5 stores, in the processed data management DB 5003, coordinates of the position of the sign of deformation and the comment in association with coordinates corresponding to the X-axis direction and the Y-axis direction in the captured image data 7A illustrated in FIG. 11A.

Specifically, based on the captured image data, which is an example of the acquired surrounding data, the detection unit 36 refers to the training images in the state type management table illustrated in FIG. 8, to generate a comment indicating the type, the amount, and the position of the physical quantity around the slope such as inflow water. For example, a comment "moss rate 30%, growing mostly in the vicinity of a height of 3 to 20 m of the starting point" is generated.

Next, the display control unit 33 controls the display 306 to display a display screen indicating a result of the sign detection processing in step S81 (step S82).

The display control unit 33 controls the display 306 to display the cross-sectional image.

Thus, the evaluation system 4 detects, as evaluation of the slope state, the shape of the slope including the three-dimensional information, the degree of damage to the slope, the sign of deformation of the slope, and the position of the slope as the evaluation target.

FIGS. 16A and 16B are diagrams of a configuration of the image capturing system. according to the present embodiment.

In the present embodiment, by installing the image capturing device 7 with high definition on the mobile apparatus 6 (e.g., vehicle) and capturing images while traveling, a high-definition image can be efficiently acquired, and a system to find small and fine changes such as cracks and broken wire nets from the image can be constructed, whereby the efficiency of inspection and screening is expected to increase.

By contrast, when a typical image capturing device such as a digital single-lens reflex camera, a compact digital camera, or a smartphone captures an image of the slope, an out-of-focus image is likely to occur.

FIG. 16A is a diagram of the configuration of a typical image capturing device 7. The image capturing device 7 includes an image capturing lens 700, an image sensor 740, and a body to hold the image sensor 740 and mount the image capturing lens 700, and a perpendicular 740P of the image sensor 740, in which the perpendicular 740P is vertical to a sensor surface, and a central axis 700C of the image capturing lens coincide with each other.

FIG. 16B is a diagram of a configuration in which the image capturing device 7 is mounted on the roof of an automobile as an example of the mobile apparatus 6 (e.g., vehicle). In FIG. 16B, the central axis 700C of the image capturing lens 700 is installed horizontally on the ground, and the image capturing device captures an image of a slope 80 (an object surface) having an inclination angle 80a to the ground.

Although the central axis 700C may be inclined to the ground, the central axis 700C is horizontal to the ground for the sake of convenience.

The image capturing lens 700 focuses on the intersection of the central axis 700C of the image capturing lens 700 and the slope 80, which is the center of the image to be captured. At this time, the image of the plane 700F is captured, and the image is the most in-focus image by the image capturing lens 700 (i.e., the most in-focus image can be captured by the image capturing lens 700 on the plane 700F). In other words, the image capturing lens 700 is designed so that when the image capturing lens 700 focuses on the plane 700F and captures the image of the entire plane 700F, the entire image on the image sensor 740 is in focus.

If the slope or a portion of the slope is within the depth of field of the image capturing lens 700, the image of the slope or the portion of the slope is in focus. In other words, the in-focus image can be captured within the depth of field. Herein, the depth of field is, for example, ±1 m, the imaging range 70B is ±1 m from the plane 700F, and the image is in focus within the range of ±1 m (i.e., the in-focus image can be captured in the imaging range 70B within the depth of field). The images of other imaging ranges 70A and 70C can be captured but the images of them are out-of-focus, or blurred-focus images.

The depth of field is a term created in the silver halide film camera era and indicates a range in which an object can be recognized in focus when a photograph is taken. The depth of field is a range determined by the pixel size of the image sensor, the resolution of the image capturing lens 700, or the F-number of the image capturing lens 700. In FIGS. 16A and 16B, the F-number of the image capturing lens 700 is, for example, 5.6.

In-focus images cannot be obtained merely by changing the orientation of the image capturing device 7 upward or downward with respect to the ground. When the image capturing device 7 changes its orientation downward to the ground, an in-focus image of a portion of the slope 80 in the vicinity of the ground may be captured. However, the image capturing device 7 cannot capture an image of another portion of the slope in the vicinity of its top, which is higher than the ground.

In the case of aerial photography, an in-focus image of the slope may be captured by changing the orientation of the flying object in accordance with the angle of the slope 80. However, it is difficult for a mobile apparatus traveling a road to capture the in-focus image of the slope.

As described above, in the configuration in which the typical image capturing device 7 is mounted on the mobile apparatus 6 (e.g., vehicle) traveling on the road, the angle of view of the image capturing lens 700 cannot be effectively used. As a result, the edge of the image is always out of focus, and it is difficult to obtain an in-focus image of the entire slope 80.

To deal with such situations, the depth of field is widened by increasing the F-number of the image capturing lens 700 with the sunlight shining on the slope 80 entirely in the daytime. However, since trees usually grow and cause shadows in the surroundings around the slope 80, the image captured by the image capturing lens with a large F-number loses the detail of the darker or shadow portion of the image (i.e., the shadow portions of the image are blacked out). In addition, the system that cannot be used on cloudy days is inconvenient for the user. The F-number can be increased in a dark weather, but the image is blacked out and unusable.

In a case where it is ineffective to capture the in-focus image of the entire slope by increasing the F-number of the image capturing lens, multiple image capturing devices 7 are used to respectively capture the images of the segmented areas of the slope 80 while traveling of the vehicle and thus capture the in-focus image of the entire slope 80.

In view of such circumstances, the aim of the present disclosure is to acquire an in-focus image of the entire slope 80 with a small number of the image capturing device 7, and to provide the image capturing device 7, the mobile apparatus system 60, and the image capturing method that do not allow an out-of-focus image when the mobile apparatus 6 (e.g., vehicle) meanders to some extent while traveling.

FIG. 17 is a diagram of the image capturing device 7 according to the present embodiment.

FIG. 17A is a diagram of the configuration of the image capturing device 7 according to the present embodiment, in which the Scheimpflug angle θ indicating the angle between the perpendicular 740P of the image sensor 740 with respect to the sensor surface and the central axis 700C of the image capturing lens 700 is set to other than 0°.

The image capturing device 7 is an example of a special camera that entirely focuses on the obliquely plane opposed to the image capturing device, and is referred to as a "tilt camera", a "tilt mount camera", a "Scheimpflug camera", or a "view camera".

FIG. 17B is a diagram of a configuration in which the image capturing device 7 in FIG. 17A is mounted on the roof of an automobile as the mobile apparatus 6 (e.g., vehicle), and the Scheimpflug angle θ is obtained by the equation (1) below.

$$\tan(\theta) = \beta \times \tan(\alpha), \tag{1}$$

where, β represents the magnification of the image capturing lens 700, α represents the angle between the direction orthogonal to the central axis 700C of the image capturing lens 700 and the slope 80, and β is determined by the focal length of the image capturing lens 700 and the distance D between the image capturing device 7 and the slope 80. Herein, α=90°−(the inclination angle 80a of the slope 80).

In the equation (1), since the Scheimpflug angle θ is set based on the angle α between the direction orthogonal to the central axis 700C of the image capturing lens 700 and the slope 80, the image capturing lens 700 can focus on the entire imaging region 70 as illustrated in FIG. 17B. In other words, a plane 700F in which the best in-focus image of the entire imaging region 70 can be captured is formed by setting the Scheimpflug angle θ. Thus, the image capturing device can capture an in-focus image in a wide region of the slope 80.

An image capturing device includes: an image capturing lens having a central axis; and an image sensor having a sensor surface and a perpendicular line perpendicular to the sensor surface, the image sensor to capture an image of an object surface of an object. The Scheimpflug angle between the central axis and the perpendicular line is set to an angle other than 0° based on an angle α obtained by subtracting an inclination angle of the object surface from 90°.

In the image capturing device according to the embodiments, the Scheimpflug angle is set based on the angle α and a distance between the image capturing device and the object surface.

An image capturing system includes: a vehicle; and an image capturing device on the vehicle, the image capturing device including: an image capturing lens having a central axis; and an image sensor having a sensor surface and a perpendicular line perpendicular to the sensor surface, the image sensor to capture an image of an object surface of an object. A Scheimpflug angle between the central axis and the perpendicular line is set to an angle other than 0° based on an angle α obtained by subtracting an inclination angle of the object surface from 90°.

An image capturing method includes: installing an image capturing device on the vehicle, the image capturing device including an image capturing lens having a central axis and an image sensor having a sensor surface; setting the Scheimpflug angle between the central axis and a perpendicular line perpendicular to the sensor surface to an angle other than 0° based on an angle α obtained by subtracting an inclination angle of the object surface from 90°; and capturing an image of an object surface of an object with the image capturing device while moving the vehicle.

Further, since the depth of field spreads in the front and rear directions perpendicular to the plane 700F, an in-focus image of the entire slope 80 can be captured, even if the mobile apparatus 6 (e.g., vehicle) meanders in the left-right direction in FIG. 17B to some extent while travelling.

Such tilt photography (perspective control photography) has typically been used for a special photographing in which the focus is partially blurred or for an inspection in a factory. Since the distance and angle between the image capturing device 7 and the object to be inspected are set to be constant in the inspection of the factory, the Scheimpflug angle is fixed (a fixed value) in accordance with the setting. The fixed value is not usually changed. However, in a case where the factory line is changed, the fixed value is changed.

In the present embodiment, the inclination angle 80a of the slope 80 varies, and the distance D between the image capturing device 7 and the slope 80 also varies depending on the road width, circumstances of the side road and the sidewalk, and the condition of the equation 1 changes. Although the Scheimpflug angle θ as in a factory application is constant, Scheimpflug angle θ is not fixed in the present embodiment.

Based on the method described above, the mobile apparatus system 60 including the mobile apparatus 6 (e.g., vehicle) can capture an in-focus image of the entire slope 80. However, since there may be many conditions or circumstances, for example, a slope having a complicated shape, a structure of the attachment to be used, performing image processing after image capturing, or image processing while using multiple image capturing devices, some embodiments will be described below.

FIG. 18 is a diagram of the data acquisition apparatus 9 according to the embodiment.

As illustrated in FIG. 1, the data acquisition apparatus 9 includes a distance sensor 8a together with the image capturing device 7. In this embodiment, the Scheimpflug angle θ in the image capturing device 7 is set based on the sensor data acquired by the distance sensor 8a.

FIG. 18A is a diagram of a configuration in which the image capturing device 7 and the distance sensor 8a are mounted on the roof of an automobile as the mobile apparatus 6 (e.g., vehicle). The distance sensor 8a can acquire 360-degree distance information in a cross section perpendicular to the moving direction of the mobile apparatus 6 (e.g., vehicle). The distance sensor 8a may be disposed at a position higher than the image capturing device 7. Preferably, the distance sensor 8a is disposed at the same height as the image capturing device 7 in order to accurately measure the distance D from the image capturing device 7 to the slope 80.

FIG. 18B is a top view of FIG. 18A, in which the distance sensor 8a and the image capturing device 7 are arranged at different positions along the moving direction of the mobile apparatus 6 (e.g., vehicle).

Figure 19A:
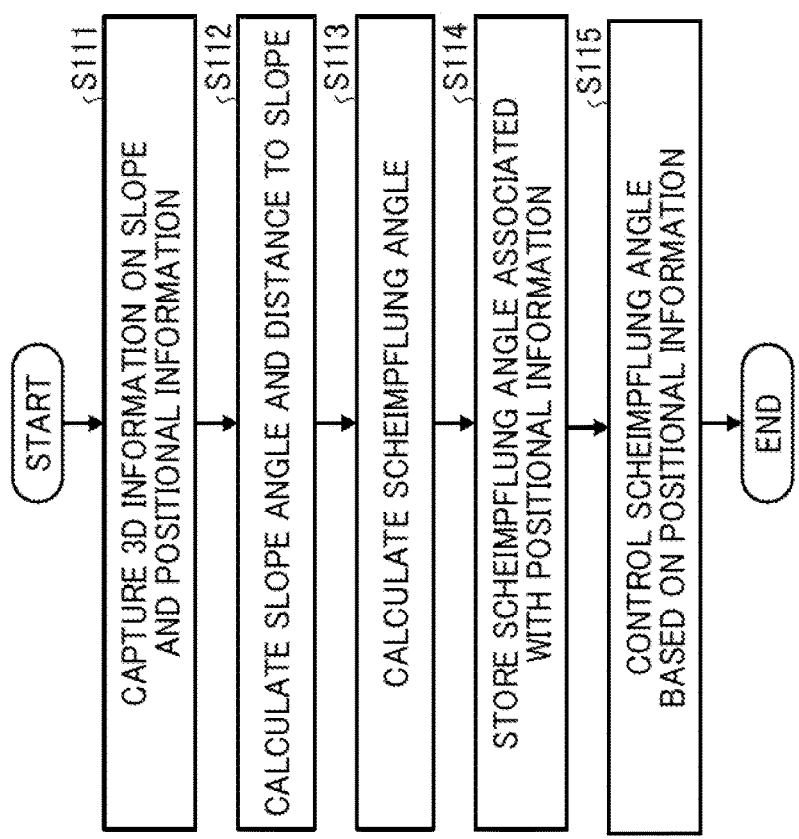
FIG. 19A is a flowchart of processing performed by the data acquisition apparatus.
Figure 19B:
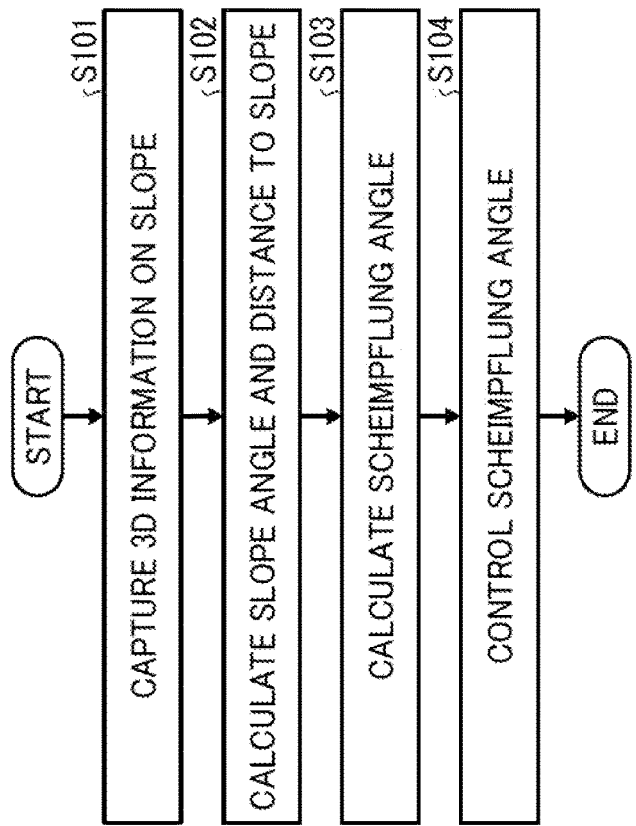
FIG. 19B is a flowchart of processing performed by the data acquisition apparatus as a modification of the flowchart in FIG. 19A.

FIGS. 19A and 19B are flowcharts of the processing of the data acquisition apparatus 9.

In FIG. 19A, the sensor data acquisition unit 96 in FIG. 6 acquires the three-dimensional information on the slope 80 based on the sensor data acquired by the distance sensor 8a (step 101).

The calculation unit 92 in FIG. 6 calculates the inclination angle 80a of the slope 80 and the distance D from the image capturing device 7 to the slope 80 based on the three-dimensional information acquired in step 101 (step 102).

Subsequently, the calculation unit 92 calculates the Scheimpflug angle θ based on the inclination angle 80a and the distance D calculated in step 102 (step 103).

Then, the image capturing device control unit 93 illustrated in FIG. 6 changes the angle between the perpendicular 740P of the image sensor 740 with respect to the sensor surface and the central axis 700C of the image capturing lens 700 by driving the attachment between the image capturing lens 700 and the body 720 with an actuator so as to obtain the Scheimpflug angle θ calculated in step S103 (step S104).

The image capturing device according to the embodiments, further includes: an actuator to change the Scheimpflug angle; and circuitry to cause the actuator to change the Scheimpflug angle based on the angle α, a distance between the image capturing device and the object surface, and the height.

The flowchart in FIG. 19B is a modification of the flowchart in FIG. 19A, and the sensor data acquisition unit 96 acquires three-dimensional information of the slope 80 based on the sensor data acquired by the distance sensor 8a and acquires position information based on the positioning data measured by the GNSS sensor 8b (step 111).

The calculation unit 92 calculates the inclination angle 80a of the slope 80 and the distance D from the image capturing device 7 to the slope 80 based on the three-dimensional information acquired in step 111 (step 112).

Subsequently, the calculation unit 92 calculates the Scheimpflug angle θ based on the inclination angle 80a and the distance D calculated in step 112 (step 113).

The storing and reading unit 99 in FIG. 6 associates the position information acquired in step S111 with the Scheimpflug angle θ, and stores the Scheimpflug angle θ calculated in step S113 in the storage unit 9000 (step S114).

The storing and reading unit 99 reads the Scheimpflug angle θ stored in step S114 from the storage unit 9000 based on the position information, and the image capturing device control unit 93 drives the attachment between the image capturing lens 700 and the body 720 with an actuator so as to obtain the read Scheimpflug angle θ calculated in step S103, thereby changing the angle between the perpendicular 740P of the image sensor 740 with respect to the sensor surface and the central axis 700C of the image capturing lens 700 (step S115).

As described above, the image capturing device control unit 93 is an example of an angle change unit to change the Scheimpflug angle θ.

Instead of steps S104 and S115, the attachment disposed between the image capturing lens 700 and the body 720 may be manually adjusted so as to obtain the calculated Scheimpflug angle θ, thereby changing the angle between the perpendicular 740P of the image sensor 740 with respect to the sensor surface and the central axis 700C of the image capturing lens 700.

Further, the sensor data acquired by the distance sensor 8a may be transferred to, for example, the evaluation apparatus 300 via the communication network 100, and, for example, the evaluation apparatus 300 may calculate the inclination angle 80a of the slope 80 and the distance D from the image capturing device 7 to the slope 80.

Preferably, the distance sensor 8a is mounted on the mobile apparatus 6 (e.g., vehicle), but may not be mounted on the mobile apparatus 6 (e.g., vehicle). Alternatively, a method in which a person goes to the slope and measures the shape of the slope or the distance from the roadway to the slope with the distance sensor 8a, and analyzes the measured values by the evaluation apparatus 300 to set the Scheimpflug angle may be employed. First Embodiment The mobile apparatus system 60 of the first embodiment is a state inspection system 1 includes: a typical automobile as the mobile apparatus 6 (e.g., vehicle); a single image capturing device 7 in which the focal length of the image capturing lens 700 is 35 mm, and the image capturing lens 700 is disposed horizontally to the ground; a single distance sensor 8a; a record and storage device as the storage unit 9000; a GNSS signal receiver (a satellite positioning device) as the GNSS sensor 8b; and a data processing means installed in an office.

In addition to the configuration described above, a typical automobile may include the image capturing device 7 for a drive recorder.

If the distance D from the image capturing device 7 to the slope 80 is calculated to be 4 m, and the inclination angle 80a of the slope 80 is calculated to be 60° based on the sensor data acquired by the distance sensor 8a, the Scheimpflug angle θ is set to 0.29° from the equation 1 because the focal length of the image capturing lens 700 is 35 mm, and the image capturing lens 700 is arranged horizontally with respect to the ground.

$$\tan(\theta) = \beta \times \tan(\alpha) \tag{1}$$

θ: 0.29°
α: 30° (=90°−60°)
β: 0.0088 (=35 mm÷4000 mm)

According to the configuration, the three-dimensional shape of the slope can be obtained while the mobile apparatus (e.g., automobile) is traveling, and at the same time, an in-focus image of the entire slope inclined with respect to the road can be acquired. In addition, by installing a satellite positioning device, a position at which the acquired data is acquired on the map is recorded, and by listing the slope for each map information, it is easy to observe the aging of the slope by acquired data every year or every several years.

In the image capturing device according to the embodiments, the Scheimpflug angle is set based on the angle between the direction orthogonal to the central axis and the object surface and a distance between the image capturing device and the object surface.

FIGS. 20A to 21B are diagrams of image processing according to the embodiments.

Figure 20A:
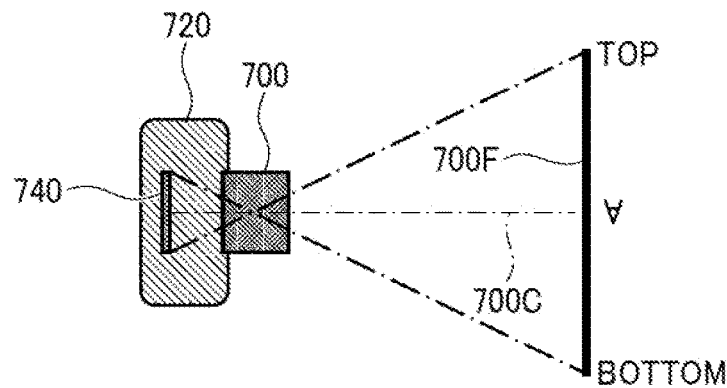
FIG. 20A is a diagram of a configuration of the typical image capturing device in FIG. 16A according to the embodiment.
Figure 20B:
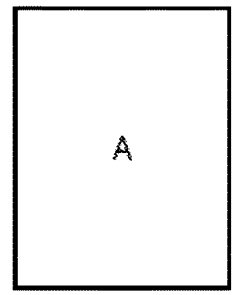
FIG. 20B is an image captured by the typical image capturing device in FIG. 20A.

FIG. 20A is a diagram of a typical image capturing device 7 described also in FIG. 16A, and FIG. 20B is a diagram of an image captured by the image capturing device 7 in FIG. 20A.

When the image capturing device 7 in FIG. 20A captures an image of a rectangular plane on which the letter "A" is written, the image sensor 740 naturally acquires a rectangular image. Herein, the rectangular plane is directly opposite to the image capturing device 7.

Figure 21A:
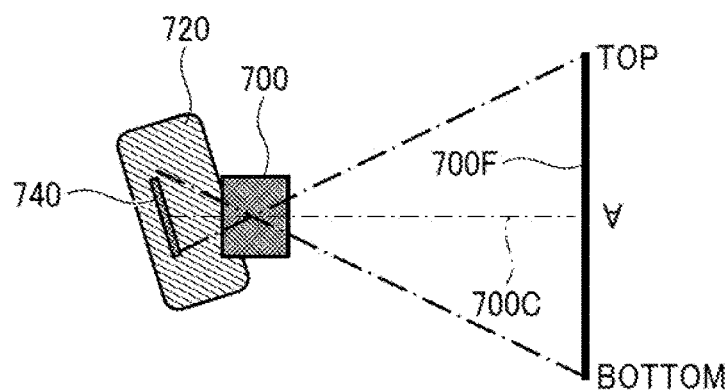
FIG. 21A is a diagram of a configuration of the image capturing apparats in FIG. 17A according to the embodiment.
Figure 21B:
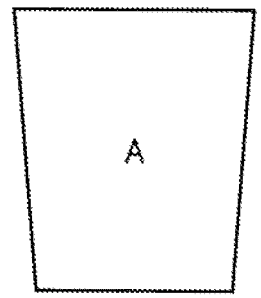
FIG. 21B is an image captured by the image capturing device in FIG. 21A.

FIG. 21A is a diagram of the image capturing device 7 according to the present embodiment described also in FIG. 17A, and FIG. 21B is a diagram of an image captured by the image capturing device 7 in FIG. 21A.

When the image capturing device 7 in FIG. 21A captures an image of a rectangular plane on which the letter "A" is written, the image acquired by the image sensor 740 has a trapezoidal shape due to the Scheimpflug angle θ. Herein, the rectangular plane is directly opposite to the image capturing device 7.

In FIG. 21A, although the light ray from the position written "TOP" and the light ray from the position written "BOTTOM" on the plane are a line-symmetry to the image capturing lens 700, the distance from the position "TOP" to the image sensor 740 is shorter than the distance from the position "BOTTOM" to the image sensor 740 because the image sensor 740 is inclined. For this reason, the captured image has a trapezoidal shape.

In this case, since the distance D from the image capturing device 7 to the slope 80 is known by the distance sensor 8a, the focal length of the image capturing lens 700 is known, and the Scheimpflug angle θ corresponding to the inclination of the image sensor 740 is known, it is easy to calculate the degree of the trapezoidal shape (trapezoidal distortion).

The data processing means performs image processing for converting the trapezoidal shape into a rectangle from known information, so that unnatural trapezoidal distortion caused by the use of the image capturing device 7 can be removed. However, in the first embodiment, the trapezoidal distortion caused by the Scheimpflug angle θ of 0.87° is a small amount, and image processing may not be performed. It is appropriate to decide whether image processing is performed or not depending on the size of the Scheimpflug angle θ and the standards for a final inspection report.

Figure 22:
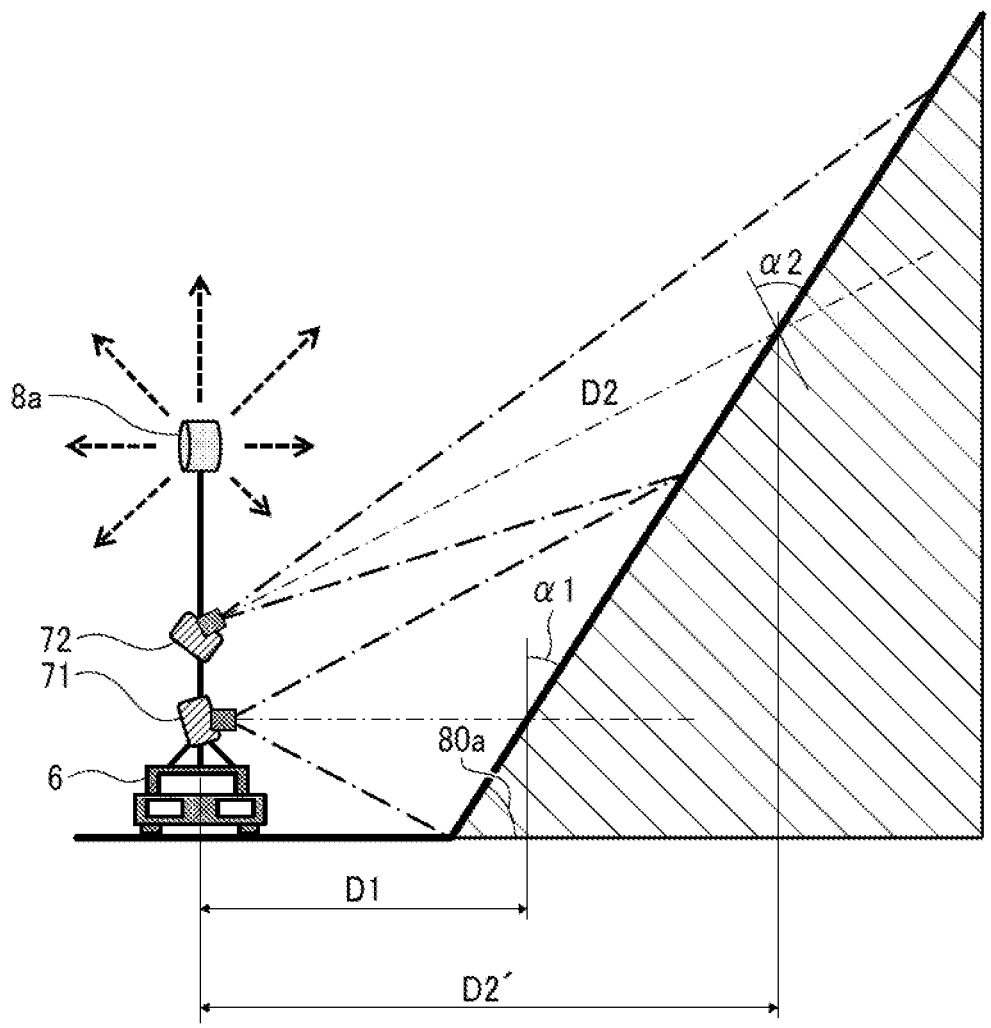
FIG. 22 is a diagram of a modification of the data acquisition apparatus according to the embodiment.

FIG. 22 is a diagram of the data acquisition apparatus 9 according to the embodiment.

The data acquisition apparatus 9 includes the first image capturing device 71 and the second imaging capturing device 72, each of which serves as the imaging capturing device 7; and a distance sensor 8a. In the present embodiment, the Scheimpflug angle θ of each of the first image capturing device 71 and the second image capturing device 72 is set based on the sensor data acquired by the distance sensor 8a.

Second Embodiment

A mobile apparatus system 60 of the second embodiment is a state inspection system 1 includes: a typical automobile as a mobile apparatus 6 (e.g., vehicle); an image capturing device 7 including a first image capturing device 71 and a second image capturing device 72; a single distance sensor 8a; a record and storage device as a storage unit 9000; a GNSS signal receiver (a satellite positioning device) as a GNSS sensor 8b installed in a mobile apparatus 6 (e.g., vehicle); a sensor data acquisition unit 96 and a calculation unit 92, each of which serves as an example of data processing unit or means. The first image capturing device 71 includes an image capturing lens 700 having a focal length of 35 mm, and the image capturing lens is horizontally arranged with respect to the ground. The second image capturing device 72 includes an image capturing lens 700 having a focal length of 35 mm, and the image capturing lens is inclined toward the sky or oriented upward by 30 degrees with respect to the ground.

Since there is a case where one image capturing device 7 cannot capture the whole image of the slope while capturing the image of the slope, the number of image capturing devices 7 is increased in the second embodiment as compared with the first embodiment.

The image capturing device according to the embodiments includes: a first image capturing device including: a first image capturing lens; and a first image sensor forming a first Scheimpflug angle with the first image capturing lens to capture a first region of the object surface; and a second image capturing device including: a second image capturing lens; and a second image sensor forming a second Scheimpflug angle with the second image capturing lens to capture a second region of the object surface. The first Scheimpflug angle is different from the second Scheimpflug angle, and the first region is different from the second region.

If the image capturing lens 700 having a short focal length (i.e., wide-angle lens) is used or the distance D to the slope 80 from the image capturing device is longer, the image of the entirely slope can be captured. However, in such a image capturing, the ability to capture the high-definition image of the slope having a deformation such as crack or peeling in detail is reduced.

As a result, an image in which a large deformation such as collapse can only be determined is obtained.

In order to obtain a resolution to discriminate a certain level of fineness, for example, a crack of 1 cm or more, an imaging region of one slope is divided by using multiple image capturing devices (e.g., the first image capturing device 71 and the second image capturing device 72).

The imaging region of the first image capturing device 71 in the second embodiment is the same as the imaging region of the second image capturing device 72 in the first embodiment. The distance D1 is 4 m. The inclination angle 80$a$ is 60°. Thus, the angle α1 is 30°, where al is an angle between the direction orthogonal to the central axis 700C of the image capturing lens 700 and the slope 80, because the orientation of the image capturing lens 700 is horizontal to the ground. The conditions described above is exactly the same as the conditions in the first embodiment.

By contrast, in the second imaging capturing device 72, the image capturing lens 700 is inclined toward the sky by 30° with respect to the ground. Since the inclination angle 80$a$ is 60°, the angle α2 between the direction orthogonal to the central axis 700C of the image capturing lens 700 and the slope 80 is 60° (=90°−30°).

Further, the distance D2 from the second imaging capturing device 72 to the slope 80 is calculated by the calculation unit 92 using the distance D2' of 7 m acquired by the distance sensor 8$a$ in the horizontal direction to the ground and the tilt angle of 30° of the second imaging capturing device 72. That is, D2 is 8.1 m (=7 m÷(cos(30°))).

The Scheimpflug angle θ2 of the second image capturing device 72 is obtained from the equation (1) below.

$$\tan(\theta) = \beta \times \tan(\alpha) \quad (1)$$

θ2: 0.43°
α: 60°
β: 0.0043 (=35 mm÷8100 mm)

Thus, even if the inclination angle 80$a$ of the slope 80 is constant, the Scheimpflug angles θ of the first image capturing device 71 and second image capturing device 72 are different from each other.

The first image capturing device 71 including the image capturing lens 700 (a first image capturing lens) and the second image capturing device 72 including the image capturing lens 700 (a second image capturing lens) are installed in a typical automobile. The focal length of the first image capturing lens and the focal length of the second image capturing lens are the same. The images of the slope are captured by the first image capturing device 71 and the second image capturing device 72, and the distance to the toe of the slope (i.e., an intersection point of the slope and the road) from the road is the same. Herein, the first image capturing device 71 and the second image capturing device 72 capture images of different regions of the slope due to division of imaging. In such a situation, the Scheimpflug angle θ of the first image capturing device 71 and the Scheimpflug angle θ of the second image capturing device 72 are different.

As described above, when multiple image capturing devices capture the different region of the slope, each tile angle of the image capturing devices is different. In addition, each Scheimpflug angle θ of the image capturing device is changed because the distance from the image capturing device apparatus to the slope is different in the direction of the central axis 700C of the image capturing lens 700.

By applying the imaging conditions described above to image capturing of the slope, an in-focus image in a wide region of the slope 80 can be obtained. The Scheimpflug angle θ becomes larger when capturing the image of an upper portion of the slope, which is a higher portion of the slope from the ground. In such a case, if a typical image capturing device is used, the depth of field is narrower, and a range in which an in-focus image can be captured become narrower.

The Scheimpflug angle θ1 of the first imaging capturing device 71 is 0.29°, and the Scheimpflug angle θ2 of the second imaging capturing device 72 is 0.43°.

As a method of obliquely assembling the body 720 of the image capturing device 7 and the image capturing lens 700, multiple types of attachments are prepared (a multiple-attachment method). For example, if an attachment is prepared at every 0.01°, the attachment may be selected according to a desired Scheimpflug angle θ.

However, many attachments are prepared in the multiple-attachment method. Thus, an adjustable attachment may be preferable. The adjustable attachment is a structure body including a dial indicating a certain Scheimpflug angle θ (a set angle) with a groove or a protrusion used to adjust the dial to the set value so as to obtain a desired Scheimpflug angle.

The adjustable attachment including the dial may change its dial value without notice when the mobile apparatus travels a long road having much vibration (an adjustable attachment method). In such a situation, the multiple-attachment method may be applied because the attachment is provided for each Scheimpflug angle θ. The dial is not changed without notice while traveling. Since the adjustable attachment is used if the road is well maintained. Depending on the road, two method is properly used.

Third Embodiment

The mobile apparatus system 60 of the third embodiment is the same as that of the second embodiment other than the image capturing lens 700 of the second image capturing device 72. The image capturing device 7 includes the first image capturing device 71 and the second image capturing device 72. In the first image capturing device 71, the focal length of the image capturing lens 700 is 35 mm, and the image capturing lens is horizontally arranged to the ground. In the second image capturing device 72, the image capturing lens is inclined toward the sky by 30° from the ground.

In the image capturing device according to the embodiments, a focal length of the first image capturing lens is different from a focal length of the second image capturing lens.

The focal length of the image capturing lens 700 of the second image capturing device 72 is 55 mm. However, since the conditions of the third embodiment other than the image capturing lens 700 is the same as that of the second embodiment. Thus, two conditions below do not change:

D2 is 8.1 m; and
the inclination angle 80$a$ is 60°.

However, when the focal length is changed, the Scheimpflug angle θ is changed. The Scheimpflug angle θ2 is obtained from the equation (1) below.

$$\tan(\theta) = \beta \times \tan(\alpha) \quad (1)$$

θ2: 0.67°
α: 60°
β: 0.0068 (=55 mm÷8100 mm)

As described above, the Scheimpflug angle θ2 is obtained as 0.67°.

An image in which deformation such as cracks and peeling on the slope surface can be captured more finely by increasing the focal length of the image capturing lens 700 (i.e., using a telephoto lens).

Although the upper portion or the top portion of the slope is farther from the image capturing device 7 than the area in the vicinity of the ground, preferably, the telephoto lens is used to check the fine deformation of the upper portion of the slope as in the area in the vicinity of the ground.

By contrast, the depth of field becomes narrower when a telephoto lens is used. Thus, the image capturing device 7 according to the present embodiment is further useful to capture the image of the slope. However, in the case where the lens is changed without changing the angle or the position of the image capturing device 7, the Scheimpflug angle θ is also changed, so that the present embodiment is exemplified.

Since the use of a telephoto lens results in a state in which the photographing magnification is different for each image capturing device 7 even at the same photographing distance, the magnification correction by the data processing means is required as necessary. Specifically, when stitching images, reduction processing is performed because each scale of the images is different, and the scale of the overlapping portion between images is different.

Figure 23A:
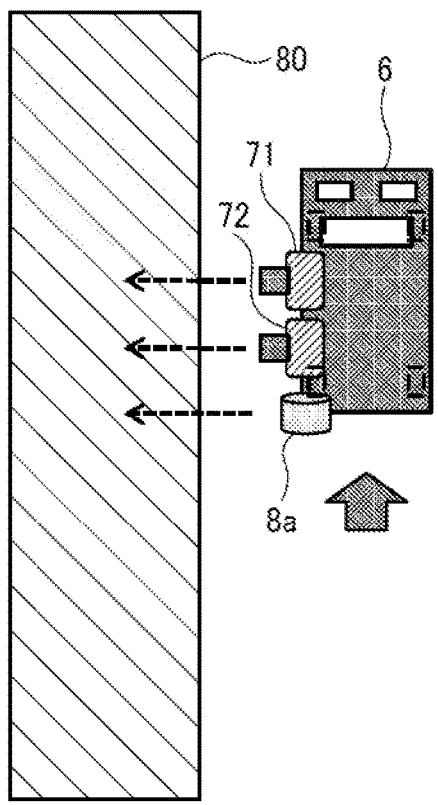
FIG. 23A is a top view of an arrangement of an image capturing device and a distance sensor according to an embodiment.
Figure 23B:
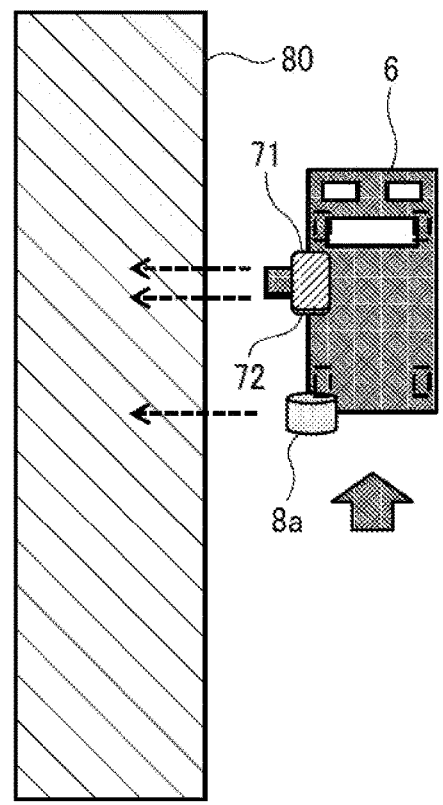
FIG. 23B is a top view of another arrangement of the image capturing device and the distance sensor according to an embodiment.

FIGS. 23A and 23B are top views of the arrangement of the image capturing device and the distance sensor according to the embodiment.

As illustrated in FIG. 23A, preferably, the first image capturing device 71, the second image capturing device 72, and the distance sensor 8*a* are arranged in parallel at the same height from the ground.

By contrast, as illustrated in FIG. 23B, the first image capturing device 71 and the second image capturing device 72 may be arranged at different heights from the ground, and the distance sensor 8*a* may be arranged in parallel at the same height as any one of the first image capturing device 71 and the second image capturing device 72.

In the image capturing device according to the embodiments, the first image capturing device has: a first distance between the first image capturing device and the object surface; and a first height from the road surface to the first image capturing device, and the second image capturing device has: a second distance between the second image capturing device and the object surface, the second distance is different from the first distance; and a second height from the road surface to the second image capturing device, the second height is different from the first height.

Figure 24:
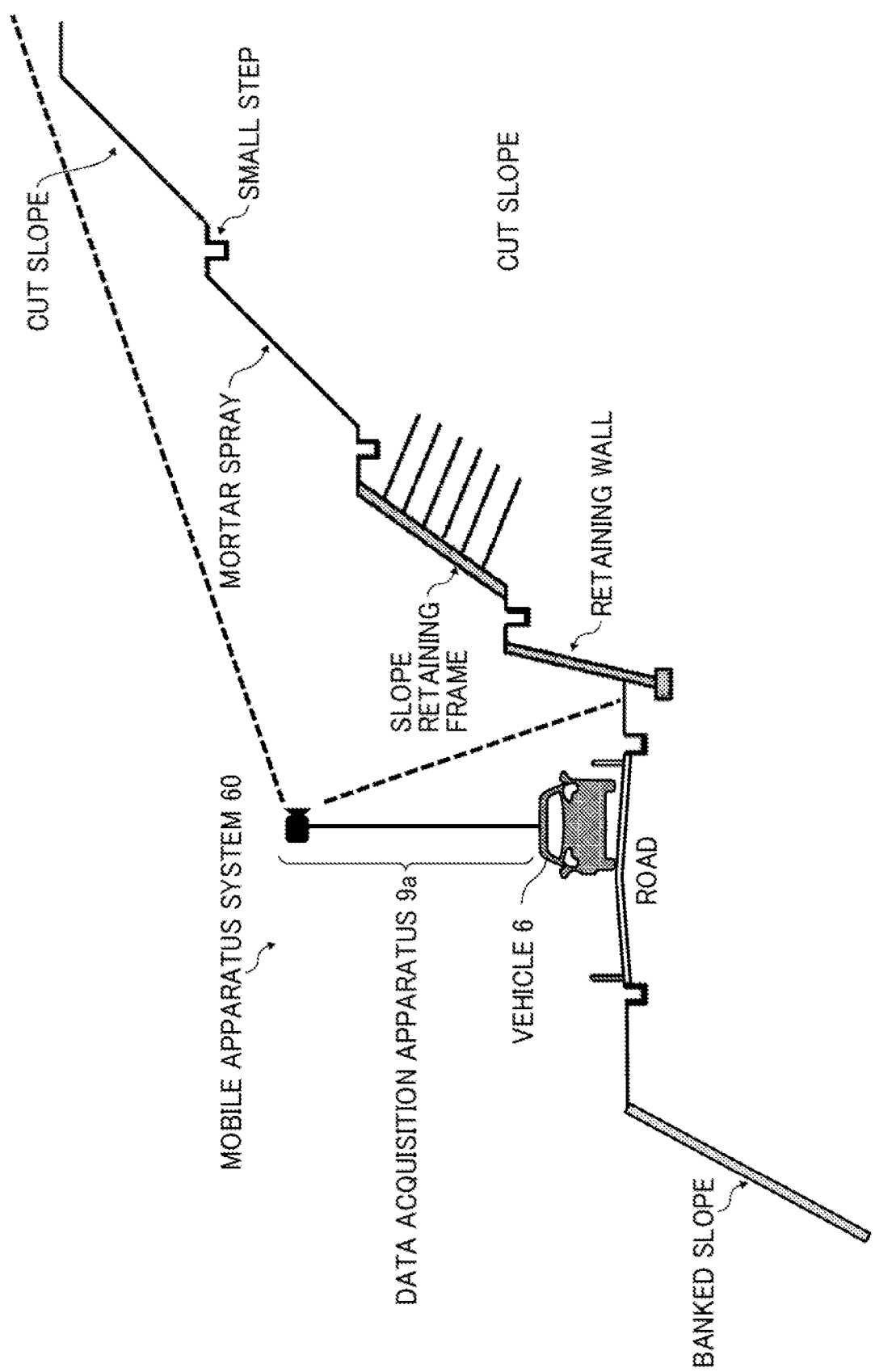
FIG. 24 is an illustration of an example of a situation in which a slope state is inspected using the mobile apparatus system according to the first modification.

In this case, the difference in height between the distance sensor 8*a* and one of the first image capturing device 71 and the second image capturing device 72 may be reflected in the distance calculation in the data processing means. Modifications of Mobile Apparatus System First Modification Referring to FIG. 24 to FIG. 26, modifications of the mobile apparatus system 60 are described. FIG. 24 is an illustration of an example of a situation in which a slope state is inspected using the mobile apparatus system 60 according to the first modification. The mobile apparatus system 60 according to first modification is a system in which the data acquisition apparatus 9 is fixed to a pole installed on the upper surface of the mobile apparatus 6 (e.g., vehicle) in order to enable imaging of high places.

Figure 25:
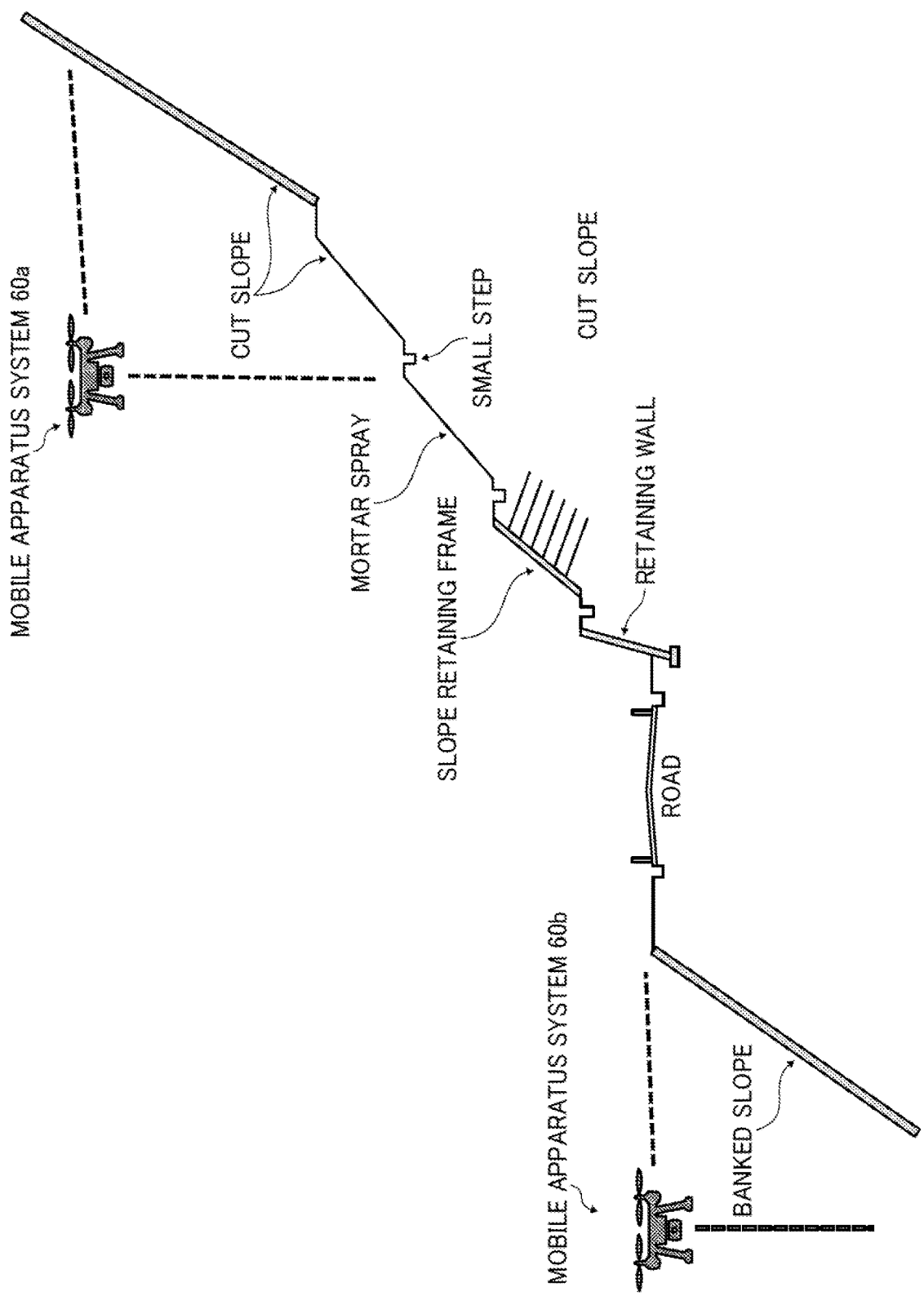
FIG. 25 is an illustration of an example of a situation in which a slope state is inspected using the mobile apparatus system according to the second modification.

Since the height of the image capturing device 7 according to the above-described embodiment from the ground is low, there are difficulties in photographing a small step at a higher position from a retaining wall, a small step at a higher position from a slope retaining frame, or a small step at a higher position from mortar spray as illustrated in FIG. 24. As illustrated in FIG. 24, since current small steps as earthwork structures are not covered, for example, dead leaves may be accumulated in the small steps, causing a trouble of clogging waterways. For this reason, small steps have to be cleaned up at regular intervals. When it is difficult for a person to climb a slope to check the degree of clogging of waterways, the degree of clogging can be checked by causing the mobile apparatus 6 (e.g., vehicle) to travel and the mobile apparatus system 60 according to the first modification that can capture an image from a high place to perform photographing processing. According to the mobile apparatus system 60, inspection efficiency increases. Second Modification FIG. 25 is an illustration of an example of a situation in which a slope state is inspected using the mobile apparatus system 60 according to the second modification. The mobile apparatus system 60 (60*a*, 60*b*) according to the second modification uses a drone, which is an example of the mobile apparatus 6 (e.g., vehicle), includes the data acquisition apparatus 9, to capture an image of a high place that cannot be captured by the image capturing device provided with the pole according to the first modification or a banked slope below the side of a road, for example.

Figure 26:
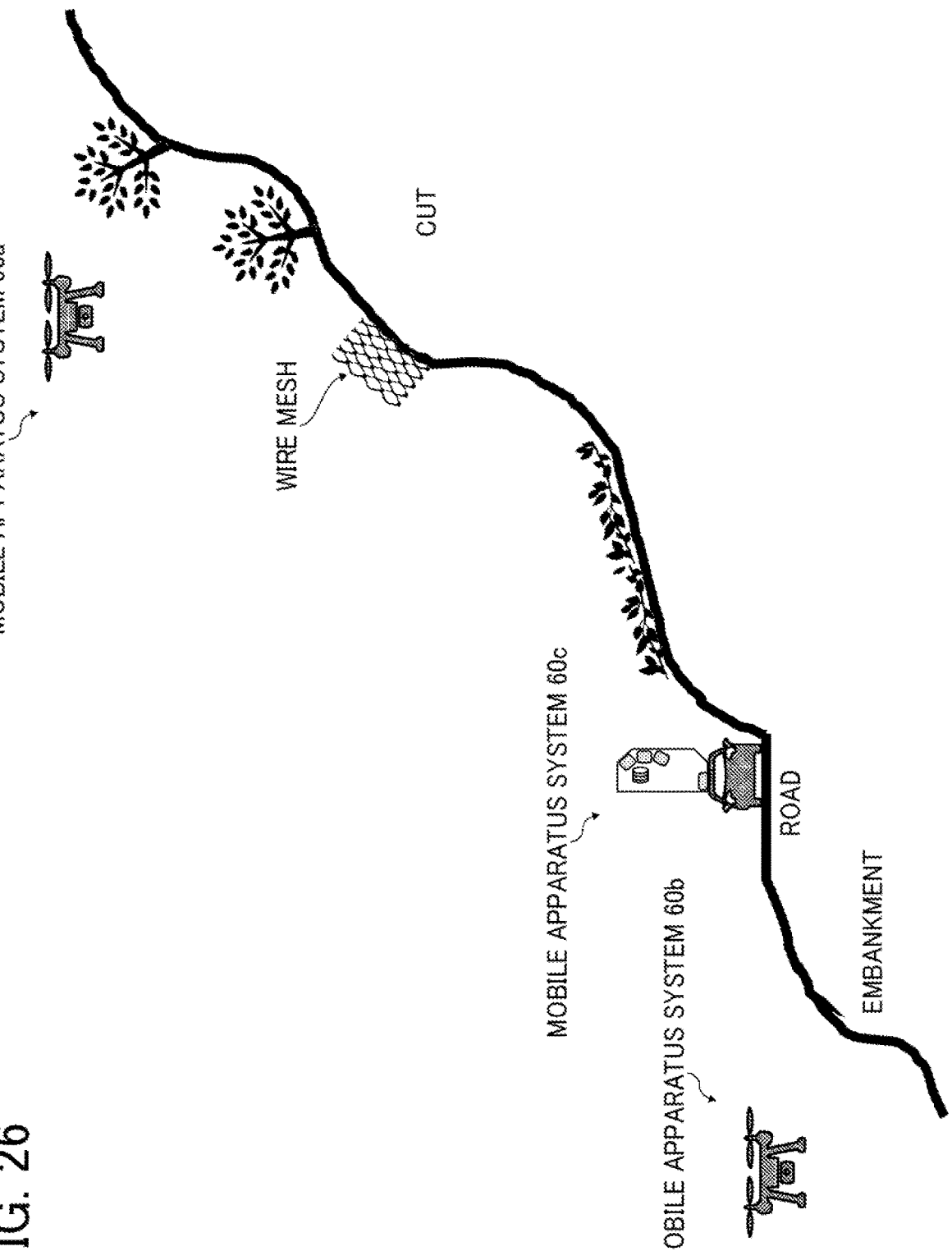
FIG. 26 is an illustration of an example of a situation in which a slope state is inspected using the mobile apparatus system according to the third modification.

The drone as the mobile apparatus 6 (e.g., vehicle) includes the image capturing device 7 and the data acquisition apparatus 9 including a sensor device such as the distance sensor 8*a*, the GNSS sensor 8*b*, or the angle sensor 8*c*. Thus, the drone as the mobile apparatus 6 (e.g., vehicle) can evaluate a state of a high place or an embarkment that cannot be evaluated by a vehicle as the mobile apparatus 6 (e.g., vehicle). As embarkments or high places are especially difficult for a person to go to close for visual observation, preferably the drone as in the second modifications captures the image. Further, embarkments or slopes in high places have many places covered with vegetation such as trees and grasses. For this reason, preferably, the data acquisition apparatus 9 includes the image capturing device 7 that can capture a wide-angle image. Third modification FIG. 26 is an illustration of an example of a situation in which a slope state is inspected using the mobile apparatus system 60 according to the third modification. As illustrated in FIG. 26, a slope has a complicated structure different from tunnels or bridges, which are structure on roads. For example, in some cases, a slope has an incline that is wavy rather than flat (e.g., an earthwork structure obtained by spraying mortar on a quay wall). In some cases, vegetation is grown on a slope. In some cases, a slope is covered with a wire mesh. For this reason, the mobile apparatus system 60 (60*a*, 60*b*, 60*c*) according to the third modification includes, as the sensor device 8, a spectral camera, an infrared camera, or an expanded depth of field (EDof) camera that can acquire wavelength information in order to distinguish an object such as a plant or a wire mesh from the shape of the slope.

Further, preferably, the mobile apparatus system 60 according to the third modification includes, in addition to or in alternative to a tool for distinguishing the shape of the slope from other objects, a lighting device provided with the data acquisition apparatus 9, so that a slope is photographed under various conditions such as weather and sunshine. Preferably, the lighting device is a line lighting device that irradiates an area corresponding to an imaging range of the image capturing device 7, or a time-division lighting device synchronized with the image capturing device 7 and the sensor device 8.

Preferably, in order to process data acquired by the mobile apparatus system 60 according to third modification, the evaluation target data generation unit 35 of the evaluation apparatus 3 has an image processing function such as an image stabilization function, a focal depth correction function (blur correction function), a distortion correction function, or a contrast enhancement function so as not to overlook even small deformations. Further, preferably, the evaluation target data generation unit 35 has a function of removing noise that conceals a deformation on an earthwork structure such as grass, moss, or wire mesh, or a function of distinguishing a shadow of grass or the like from a deformation such as a crack. Thus, using the mobile apparatus system 60 according to the third modification, the state inspection system 1 can accurately evaluate a slope state in a place having a complicated structure or a place where grass, moss, a wire mesh, or the like is present.

As described above, the image capturing device 7 according to one embodiment of the present invention is the image capturing device 7 which is installed on the mobile apparatus 6 (e.g., vehicle) and captures an image of the slope 80, and includes the image capturing lens 700 and the image sensor 740, and the Scheimpflug angle θ indicating the angle between the perpendicular 740P of the image sensor 740 with respect to the sensor surface and the central axis 700C of the image capturing lens 700 is set according to the angle α between the direction orthogonal to the central axis 700C of the image capturing lens 700 and the slope 80. Thus, the image capturing device can capture an in-focus image in a wide region of the slope.

The Scheimpflug angle θ is set based on an angle α between the direction orthogonal to the central axis 700C of the image capturing lens 700 and the slope 80 and a distance D from the image capturing device 7 to the slope 80. Thus, even when the distance D from the image capturing device 7 to the slope 80 is different, an in-focus image in a wide region of the slope 80 can be obtained.

The Scheimpflug angle θ is also set based on the angle α between the direction orthogonal to the central axis 700C of the image capturing lens 700 and the slope 80 and the height H from the driving surface of the mobile apparatus 6 (e.g., vehicle) to the image capturing device 7.

The image capturing device according to the embodiments, further includes: an installation member to install the image capturing device on a vehicle travelable along a road surface. The Scheimpflug angle is set based on the angle α and a height from the road surface to the image capturing device.

When the height H of the image capturing device 7 from the travelling surface with respect to the mobile apparatus 6 (e.g., vehicle) is different, the distance D from the image capturing device 7 to the slope 80 is different, but even in such a case, an in-focus image in a wide region of the slope 80 can be obtained.

The image capturing device 7 includes the first image capturing lens, a first image capturing device 71 including having a first image sensor, a second image capturing lens, and a second image capturing device 72 including a second image sensor. The first image capturing device 71 and the second image capturing device 72 respectively capture different regions on the slope 80. The first image capturing device 71 differs from the second image capturing device 72 in the distance D to the slope 80 or the height H with respect to a mobile apparatus 6 (e.g., vehicle), and the Scheimpflug angle θ differs from the second image capturing device 72.

Thus, for each of the different regions on the slope, an in-focus image in a wide region of the slope 80 can be obtained. The second image capturing device 72 may capture the image of the slope 80 having an inclination angle 80a different from another inclination angle of the slope 80 in which the image of the slope 80 is captured by the first imaging capturing device 71.

The first image capturing device 71 differs from the second image capturing device 72 in the distance D to the slope 80 or the height H with respect to the mobile apparatus 6 (e.g., vehicle).

As a result, an in-focus image in a wide region of the slope 80 for each region having a different distance from the image capturing device to the slope or a different height from the driving surface to the image capturing device can be obtained.

The focal length of the first image capturing lens is different from the focal length of the second image capturing lens. As a result, an in-focus image in a wide region of the slope 80 for each region having a different distance from the image capturing device to the slope can be obtained.

The image capturing device 7 includes the image capturing device control unit 93 that is an example of an angle change unit for changing a Scheimpflug angle θ according to an angle α between the direction orthogonal to the central axis 700C of the image capturing lens 700 and the slope 80, the distance D to the slope 80, or the height H with respect to a mobile apparatus 6 (e.g., vehicle).

Thus, even when the angle α between the direction orthogonal to the central axis 700C of the image capturing lens 700 and the slope 80, the distance D to the slope 80 from the image capturing device 7, or the height H with respect to the mobile apparatus 6 (e.g., vehicle) changes, an in-focus image in a wide region of the slope 80 can be obtained by changing the Scheimpflug angle θ.

The data acquisition apparatus 9 includes the image capturing device 7 and a sensor device 8. The data acquisition apparatus 9 includes the sensor data acquisition unit 96 that is an example of a distance information acquisition unit for acquiring distance information indicating a distance D from the image capturing device 7 to the slope 80, and the image capturing device control unit 93 changes the Scheimpflug angle θ based on the distance information.

The sensor data acquisition unit 96 acquires distance information based on the light projected from the projection unit to the slope 80 and reflected from the slope 80.

In the data acquisition unit according to the embodiments, the distance sensor is to emit light from a projection unit to the object surface and receives the light reflected from the object surface to measure the distance.

Thus, the Scheimpflug angle θ can be changed in accordance with the distance D from the image capturing device to the slope 80, and an in-focus image in a wide region of the slope 80 can be obtained.

The data acquisition apparatus 9 includes a sensor data acquisition unit 96 that is an example of the position information acquisition unit that acquires position information indicating the position of the mobile apparatus 6 (e.g., vehicle), and the imaging capturing device control unit 93 changes the Scheimpflug angle θ based on the position information. Preferably, the Scheimpflug angle θ is stored in association with the position information, but the distance D from the imaging capturing device 7 to the slope 80 or the inclination angle 80a of the slope 80 may be stored in association with the position information.

Thus, the Scheimpflug angle θ is changed in accordance with the position information indicating the position of the mobile apparatus 6 (e.g., vehicle), and an in-focus image in a wide region of the slope 80 can be obtained.

The image capturing device 7 is installed on the mobile apparatus 6 (e.g., vehicle) so that the central axis 700C of the image capturing lens 700 faces in a direction intersecting with the direction in which the mobile apparatus 6 (e.g., vehicle) moves.

As a result, an in-focus image in a wide region of the slope 80 directly opposite to the direction intersecting the direction in which the mobile apparatus 6 (e.g., vehicle) travels can be obtained.

A mobile apparatus system 60 that is an example of an image capturing system according to the present embodiment includes the mobile apparatus 6 (e.g., vehicle) and an image capturing device 7 that is installed on the mobile apparatus 6 (e.g., vehicle) and captures an image of the slope 80, the image capturing device 7 includes the image capturing lens 700 and an image sensor 740, and the Scheimpflug angle θ indicating the angle between the perpendicular 740P of the image sensor 740 with respect to the sensor surface and the central axis 700C of the imaging capturing lens 700 is set according to an angle α between the direction orthogonal to the central axis 700C of the imaging capturing lens 700 and the slope 80.

Then image capturing method to capture the image of the slope 80 using the image capturing device 7 installed on the mobile apparatus 6 (e.g., vehicle). The image capturing device 7 includes the image capturing lens 700 and an image sensor 740, and the Scheimpflug angle θ indicating the angle between the perpendicular 740P of the image sensor 740 with respect to the sensor surface and the central axis 700C of the image capturing lens 700 is set according to the angle α between the direction orthogonal to the central axis 700C of the image capturing lens 700 and the slope 80. Supplementary Information on Embodiments: Each function of the embodiment described above can be implemented by one or more processing circuits. Here, the "processing circuit" in the present embodiment includes a processor programmed to execute each function by software, such as a processor implemented by an electronic circuit, an ASIC (Application Specific Integrated Circuit), a DSP (digital signal processor), an FPGA (field programmable gate array), a SOC (System on a chip), a GPU (Graphics Processing Unit), and devices such as conventional circuit modules designed to execute each function described above.

Each of the tables of the above-described embodiments may be generated by learning effect of machine learning. In addition, in alternative to using the tables, the data of each related item may be classified by the machine learning. In the present disclosure, the machine learning is defined as a technology that makes a computer to acquire human-like learning ability. In addition, the machine learning refers to a technology in which a computer autonomously generates an algorithm required for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

Further, various tables of any one of the above-described embodiments may be generated by an image processing technology. Examples of the image processing technology include, but are not limited to, edge detection, straight line detection, and binarization processing. In substantially the same manner, when voice is used, a voice conversion technology such as Fourier transform may be used.

Although the evaluation system, the state inspection system, the evaluation method, and the program according to one or more embodiments of the present disclosure have been described above, the above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Aspects of the present invention are as follows, for example.

In a first aspect, an image capturing device includes: an image capturing lens having a central axis; and an image sensor having a sensor surface and a perpendicular line perpendicular to the sensor surface, the image sensor to capture an image of an object surface of an object. A Scheimpflug angle between the central axis and the perpendicular line is set to an angle other than 0° based on an angle α obtained by subtracting an inclination angle of the object surface from 90°.

In a second aspect, in the image capturing device according to the first aspect, the Scheimpflug angle is set based on the angle α and a distance between the image capturing device and the object surface.

In a third aspect, the image capturing device according to the first aspect or the second aspect, further includes: an installation member to install the image capturing device on a vehicle travelable along a road surface. The Scheimpflug angle is set based on the angle α and a height from the road surface to the image capturing device.

In a fourth aspect, the image capturing device according to any one of the first aspect to the third aspect includes: a first image capturing device including: a first image capturing lens; and a first image sensor forming a first Scheimpflug angle with the first image capturing lens to capture a first region of the object surface; and a second image capturing device including: a second image capturing lens; and a second image sensor forming a second Scheimpflug angle with the second image capturing lens to capture a second region of the object surface. The first Scheimpflug angle is different from the second Scheimpflug angle, and the first region is different from the second region.

In a fifth aspect, in the image capturing device according to the fourth aspect, the first image capturing device has: a first distance between the first image capturing device and the object surface; and a first height from the road surface to the first image capturing device, and the second image capturing device has: a second distance between the second image capturing device and the object surface, the second distance is different from the first distance; and a second height from the road surface to the second image capturing device, the second height is different from the first height.

In a sixth aspect, in the image capturing device according to the fourth aspect, a focal length of the first image capturing lens is different from a focal length of the second image capturing lens.

In a seventh aspect, the image capturing device according to any one of the third aspect to the sixth aspect, further includes: an actuator to change the Scheimpflug angle; and circuitry to cause the actuator to change the Scheimpflug angle based on the angle α, a distance between the image capturing device and the object surface, and the height.

In a data acquisition unit includes: the image capturing device according to the seventh aspect; and a distance sensor to measure a distance between the image capturing device and the object surface. The circuitry changes the Scheimpflug angle based on the distance measured by the distance sensor.

In a ninth aspect, in the data acquisition unit according to the eighth aspect, the distance sensor is to emit light from a projection unit to the object surface and receives the light reflected from the object surface to measure the distance.

In a tenth aspect, the data acquisition unit according to the eighth aspect, further includes: a position detector to detect a position of the vehicle on which the image capturing device is installed. The circuitry changes the Scheimpflug angle based on the position detected by the position detector.

In an eleventh aspect, in the data acquisition unit according to any one of the eighth aspect to tenth aspect, the central axis of the image capturing lens on the vehicle intersects a moving direction of the vehicle.

In a twelfth aspect, an image capturing system includes: a vehicle; and an image capturing device on the vehicle, the image capturing device including: an image capturing lens having a central axis; and an image sensor having a sensor surface and a perpendicular line perpendicular to the sensor surface, the image sensor to capture an image of an object surface of an object. A Scheimpflug angle between the central axis and the perpendicular line is set to an angle other than 0° based on an angle α obtained by subtracting an inclination angle of the object surface from 90°.

In a thirteenth aspect, an image capturing method includes: installing an image capturing device on the vehicle, the image capturing device including an image capturing lens having a central axis and an image sensor having a sensor surface; setting a Scheimpflug angle between the central axis and a perpendicular line perpendicular to the sensor surface to an angle other than 00 based on an angle α obtained by subtracting an inclination angle of the object surface from 90°; and capturing an image of an object surface of an object with the image capturing device while moving the vehicle.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image capturing device comprising:
an image capturing lens having a central axis; and
an image sensor having a sensor surface and a perpendicular line perpendicular to the sensor surface, the image sensor configured to capture an image of an object surface of an object,
wherein a Scheimpflug angle between the central axis and the perpendicular line is set to an angle other than 0° based on an angle α obtained by subtracting an inclination angle of the object surface from 90°.

2. The image capturing device according to claim 1,
wherein the Scheimpflug angle is set based on the angle α and a distance between the image capturing device and the object surface.

3. The image capturing device according to claim 1, further comprising:
an installation member configured to install the image capturing device on a vehicle travelable along a road surface,
wherein the Scheimpflug angle is set based on the angle α and a height from the road surface to the image capturing device.

4. The image capturing device according to claim 3, including:
a first image capturing device including:
a first image capturing lens; and
a first image sensor forming a first Scheimpflug angle with the first image capturing lens to capture a first region of the object surface; and
a second image capturing device including:
a second image capturing lens; and
a second image sensor forming a second Scheimpflug angle with the second image capturing lens to capture a second region of the object surface,
wherein the first Scheimpflug angle is different from the second Scheimpflug angle, and
the first region is different from the second region.

5. The image capturing device according to claim 4,
wherein the first image capturing device has:
a first distance between the first image capturing device and the object surface; and
a first height from the road surface to the first image capturing device, and
the second image capturing device has:
a second distance between the second image capturing device and the object surface, the second distance is different from the first distance; and
a second height from the road surface to the second image capturing device, the second height is different from the first height.

6. The image capturing device according to claim 4,
wherein a focal length of the first image capturing lens is different from a focal length of the second image capturing lens.

7. The image capturing device according to claim 3, further comprising:
an actuator configured to change the Scheimpflug angle; and
circuitry configured to cause the actuator to change the Scheimpflug angle based on the angle α, a distance between the image capturing device and the object surface, and the height.

8. The image capturing device according to claim 3,
wherein the central axis of the image capturing lens on the vehicle intersects a moving direction of the vehicle.

9. A data acquisition unit comprising:
the image capturing device according to claim 7; and
a distance sensor configured to measure a distance between the image capturing device and the object surface,
wherein the circuitry changes the Scheimpflug angle based on the distance measured by the distance sensor.

10. The data acquisition unit according to claim 9,
wherein the distance sensor is configured to emit light from a projection unit to the object surface and receives the light reflected from the object surface to measure the distance.

11. The data acquisition unit according to claim 9, further comprising:
- a position detector configured to detect a position of the vehicle on which the image capturing device is installed,
- wherein the circuitry changes the Scheimpflug angle based on the position detected by the position detector.

12. An image capturing system comprising:
- a vehicle; and
- an image capturing device on the vehicle, the image capturing device comprising:
  - an image capturing lens having a central axis; and
  - an image sensor having a sensor surface and a perpendicular line perpendicular to the sensor surface, the image sensor configured to capture an image of an object surface of an object,
- wherein a Scheimpflug angle between the central axis and the perpendicular line is set to an angle other than 0° based on an angle α obtained by subtracting an inclination angle of the object surface from 90°.

13. An image capturing method comprising:
- installing an image capturing device on a vehicle, the image capturing device including an image capturing lens having a central axis and an image sensor having a sensor surface;
- setting a Scheimpflug angle between the central axis and a perpendicular line perpendicular to the sensor surface to an angle other than 0° based on an angle α obtained by subtracting an inclination angle of the object surface from 90°; and
- capturing an image of an object surface of an object with the image capturing device while moving the vehicle.

* * * * *